US011493037B1

(12) United States Patent
Schumann

(10) Patent No.: US 11,493,037 B1
(45) Date of Patent: Nov. 8, 2022

(54) PUMP SYSTEM

(71) Applicant: Laverne Schumann, Blue Grass, IA (US)

(72) Inventor: Laverne Schumann, Blue Grass, IA (US)

(*) Notice: Subject to any disclaimer, the term of this patent is extended or adjusted under 35 U.S.C. 154(b) by 17 days.

(21) Appl. No.: 17/034,910

(22) Filed: Sep. 28, 2020

Related U.S. Application Data

(63) Continuation of application No. 15/155,962, filed on May 16, 2016, now abandoned, which is a continuation-in-part of application No. 14/808,820, filed on Jul. 24, 2015, now Pat. No. 9,863,418, and a continuation-in-part of application No. 14/283,778, filed on May 21, 2014, now abandoned.

(60) Provisional application No. 62/162,187, filed on May 15, 2015.

(51) Int. Cl.
F04C 2/20 (2006.01)
F04C 15/00 (2006.01)
F04C 14/24 (2006.01)
F04C 15/06 (2006.01)
F01M 1/02 (2006.01)
F04C 13/00 (2006.01)

(52) U.S. Cl.
CPC .......... *F04C 15/0042* (2013.01); *F01M 1/02* (2013.01); *F04C 2/20* (2013.01); *F04C 13/001* (2013.01); *F04C 14/24* (2013.01); *F04C 15/06* (2013.01); *F04C 2210/206* (2013.01); *F04C 2240/20* (2013.01); *F04C 2240/30* (2013.01); *F04C 2270/185* (2013.01)

(58) Field of Classification Search
CPC ...... F04C 2/10; F04C 2/20; F04C 1/02; F04C 15/0042; F04C 14/24; F04C 15/06; F04C 13/001; F04C 2240/30; F04C 2240/20; F04C 2210/206
See application file for complete search history.

(56) References Cited

U.S. PATENT DOCUMENTS

| 1,684,910 A | 9/1928 | Cooper |
| 1,795,579 A | 3/1931 | Storey |
| 2,287,318 A | 6/1942 | Frederic |

(Continued)

FOREIGN PATENT DOCUMENTS

| DE | 102008056326 A1 * | 5/2010 | ............. F04B 23/12 |
| GB | 559391 A | 2/1944 | |

(Continued)

OTHER PUBLICATIONS

PCT/US2015/042059; Notification of Transmittal of the International Search Report and the Written Opinion of the International Searching Authority, or the Declaration; dated Nov. 9, 2015.

*Primary Examiner* — Philip E Stimpert
(74) *Attorney, Agent, or Firm* — Hamilton IP Law, PC; Jay R. Hamilton; Charles A. Damschen

(57) ABSTRACT

One embodiment of a modular pump includes a cover and a housing that may be engaged with one another during operation. A gearset may be positioned within an internal portion of the housing. If the modular pump is configured as a rotary pump, the gear set may be comprised of an inner gear positioned within a portion of a ring gear. The modular pump may include a spacer positioned between the cover and the housing to allow the modular pump to be configured with gear sets of varying axial dimensions.

5 Claims, 29 Drawing Sheets

(56) References Cited

U.S. PATENT DOCUMENTS

| | | |
|---|---|---|
| 2,641,192 A | 6/1953 | Lindberg |
| 2,704,035 A | 3/1955 | Bader |
| 2,816,513 A | 12/1957 | Watson |
| 3,053,191 A | 9/1962 | Weigert |
| 3,130,682 A | 4/1964 | Meads |
| 3,490,383 A | 1/1970 | Parrett |
| 4,233,005 A | 11/1980 | Bottoms et al. |
| 4,706,968 A | 11/1987 | Orlowski |
| 4,893,650 A | 1/1990 | Chisholm et al. |
| 4,984,975 A | 1/1991 | Thompson |
| 5,810,571 A | 9/1998 | Cross et al. |
| 5,825,110 A | 10/1998 | Page |
| 5,879,140 A | 3/1999 | Ellison |
| 6,206,032 B1 * | 3/2001 | Hill ................... F16K 15/044 184/105.3 |
| 6,824,486 B2 | 11/2004 | Maeno et al. |
| 7,797,937 B2 | 9/2010 | Endicott et al. |
| 8,038,416 B2 | 10/2011 | Ono et al. |
| 8,398,381 B1 | 3/2013 | Schumann |
| 2004/0045609 A1 | 3/2004 | Apostolides |
| 2004/0161354 A1 | 8/2004 | Morita |
| 2005/0098385 A1 | 5/2005 | Ono et al. |
| 2005/0271538 A1 | 12/2005 | Knighton et al. |
| 2006/0029509 A1 | 2/2006 | Kurata et al. |
| 2006/0186476 A1 | 8/2006 | Suzuki |
| 2007/0098586 A1 | 5/2007 | Clark |
| 2007/0237665 A1 | 10/2007 | Holtzapple et al. |
| 2010/0051388 A1 | 3/2010 | Clark et al. |
| 2011/0014080 A1 | 1/2011 | Robillard |
| 2013/0146039 A1 | 6/2013 | Pursifull |
| 2014/0086763 A1 | 3/2014 | Osterhaus et al. |

FOREIGN PATENT DOCUMENTS

| | | | |
|---|---|---|---|
| JP | 09126153 | | 5/1997 |
| JP | 2001107880 A | * | 4/2001 .......... F04C 15/0069 |

* cited by examiner

PUMP SYSTEM

CROSS REFERENCE TO RELATED APPLICATIONS

The present application is a continuation of and claims priority from U.S. patent application Ser. No. 15/155,962 filed on May 16, 2016, which application was a continuation-in-part of and claims priority from U.S. patent application Ser. No. 14/808,820 filed on Jul. 24, 2015 and is also a continuation-in-part of and claims priority from U.S. patent application Ser. No. 14/283,778 filed on May 21, 2014, U.S. patent application Ser. No. 15/155,962 also claims the filing benefit of provisional U.S. patent application Ser. No. 62/162,187 filed on May 15, 2015, all of the preceding applications are incorporated by reference herein in their entireties.

FIELD OF INVENTION

This invention relates generally to pumps and equipment used therewith.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Many internal combustion engine oil pumps are of the gear pump type wherein the drive gear is connected to the engine camshaft, or other rotational power source. The drive gear, in turn, rotates an idler gear, and the pump consists of a main body and cover housing, which are affixed to one another during use. Other engine oil pumps use a rotary gear set having a rotor gear and a stator ring gear. The cover housing may also include a relief valve. An oil inlet or "pick-up tube" is often mounted on the cover housing and is located within the engine pan sump, permitting oil to be drawn into the pump from the crank case.

In high performance engines such as those used in race cars, the high engine RPM causes rapid wear in the oil pump, as such pumps are built to close tolerances in order to achieve the high oil flow necessary to lubricate the rapidly rotating engine. Conventional internal combustion engine oil pumps utilize a drive shaft, driven from the engine camshaft or ignition distributor, and a driven gear is mounted upon the lower end of the drive shaft.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION - LISTING OF ELEMENTS

Figure 1:
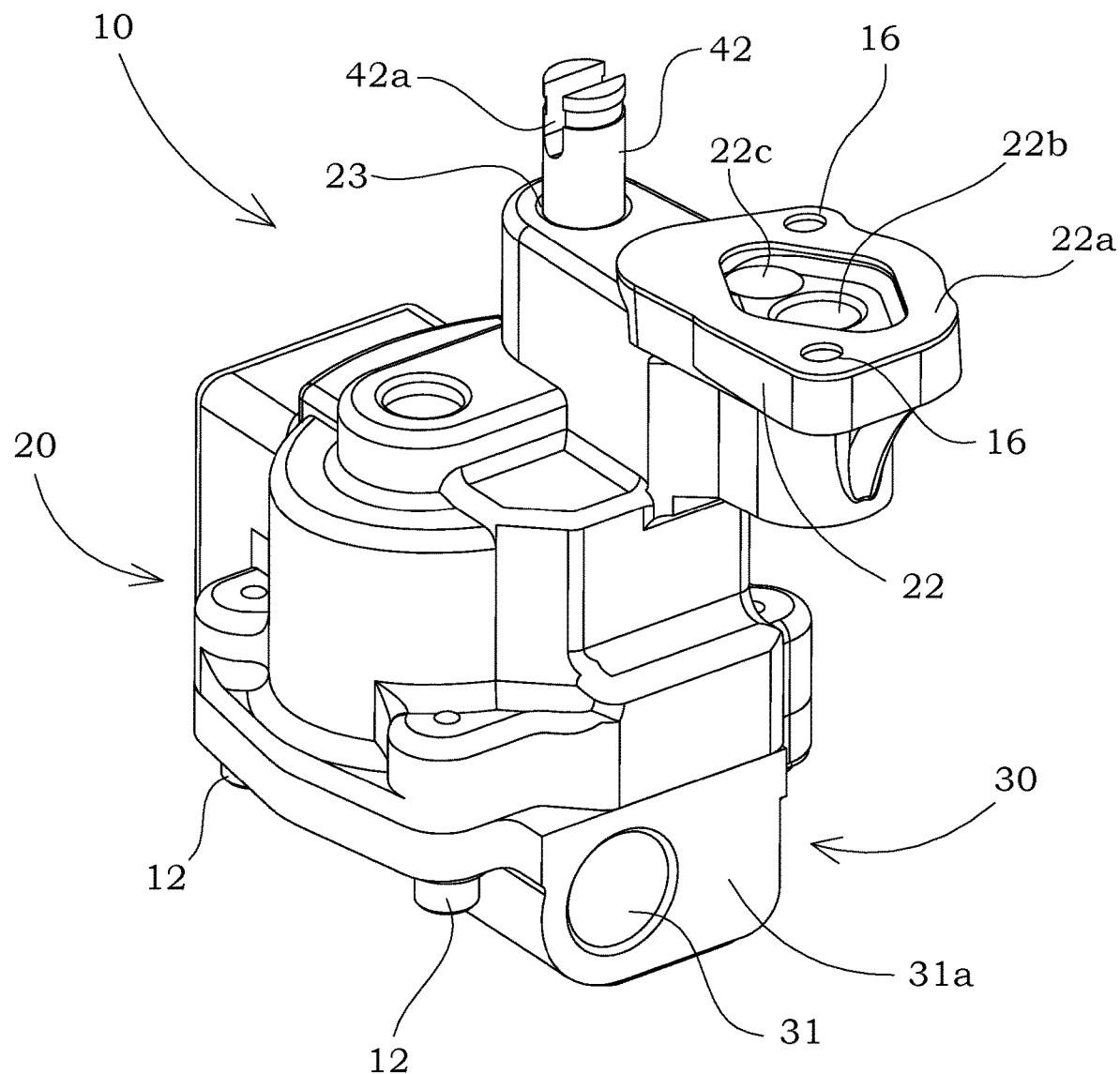
FIG. 1 provides a perspective view of one embodiment of a pump constructed according to the present disclosure.

| ELEMENT DESCRIPTION | ELEMENT # |
|---|---|
| Pump | 10 |
| Fastener | 12 |
| Diffuser screen | 14 |
| Aperture | 16 |
| Pick-up tube | 18 |
| Main cap | 19 |
| Main body | 20 |
| Mounting base | 22 |
| Outlet interface | 22a |
| Mounting passage | 22b |
| Pump outlet port | 22c |
| Pump outlet passage | 22d |
| Drive gear shaft bore | 23 |
| Chamfer relief | 23a |
| Drive gear shaft bore groove | 23b |
| Cover housing interface surface | 24 |
| Gear chamber | 25 |
| Radial inlet port | 26 |
| Radial inlet port passage | 26a |
| Oil feed drive gear trough | 27a |
| Oil feed idler gear trough | 27b |
| Axial gear interface surface | 28a |
| Radial gear interface surface | 28b |
| Idler gear shaft | 29 |
| Cover housing | 30 |
| Inlet channel | 31 |
| Pick-up tube interface | 31a |
| Anitcavitation groove | 32 |
| Main body interface surface | 33 |
| Pressure relief inlet cavity | 34 |
| Pressure relief assembly | 34' |
| Pressure relief inlet | 34a |
| Pressure relief retainer channel | 34c |
| Pressure relief inlet cavity trough | 34d |

DETAILED DESCRIPTION - LISTING OF ELEMENTS -continued

| ELEMENT DESCRIPTION | ELEMENT # |
|---|---|
| Pressure relief outlet | 35 |
| Axial inlet port | 36 |
| Radial inlet port feed passage | 36a |
| Return channel | 38 |
| Drive gear | 40 |
| Drive gear shaft | 42 |
| Drive gear shaft connector | 42a |
| Drive gear shaft lower end | 42b |
| Drive gear tooth | 44 |
| Drive gear tooth dimple | 46 |
| Idler gear | 50 |
| Idler gear tooth | 54 |
| Idler gear tooth dimple | 56 |
| Spring | 62 |
| Valve | 64 |
| Spring connector | 66 |
| Spring retainer | 68 |
| First pressure relief channel | 72 |
| Cross channel | 73 |
| Second pressure relief channel | 74 |
| Rotary pump | 80 |
| Rotary gear set | 81 |
| Rotor gear | 82 |
| Rotor dimple | 82a |
| Rotor groove | 83 |
| Stator ring gear | 84 |
| Stator dimple | 84a |
| Stator groove | 85 |
| Stator radial bore | 86 |
| Rotary housing | 90 |
| Rotary cover | 90a |
| Axial face | 90b |
| Recess | 90c |
| Outlet cavity | 91 |
| Outlet | 92 |
| Inlet cavity | 93 |
| Inlet | 94 |
| Inlet reservoir | 94a |
| Pressure relief cavity | 95 |
| Plug | 95a |
| Pressure relief discharge | 96 |
| Pressure relief portion | 97 |
| Return channel | 98 |
| Return tube | 99 |
| Modular pump | 100 |
| Inner gear | 102 |
| Inner gear shaft | 102a |
| Ring gear | 104 |
| Spacer | 110 |
| Ear | 112 |
| Ear aperture | 112a |
| Vapor/Gas removal assembly | 120 |
| Ball | 122 |
| Outlet | 124 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 2:
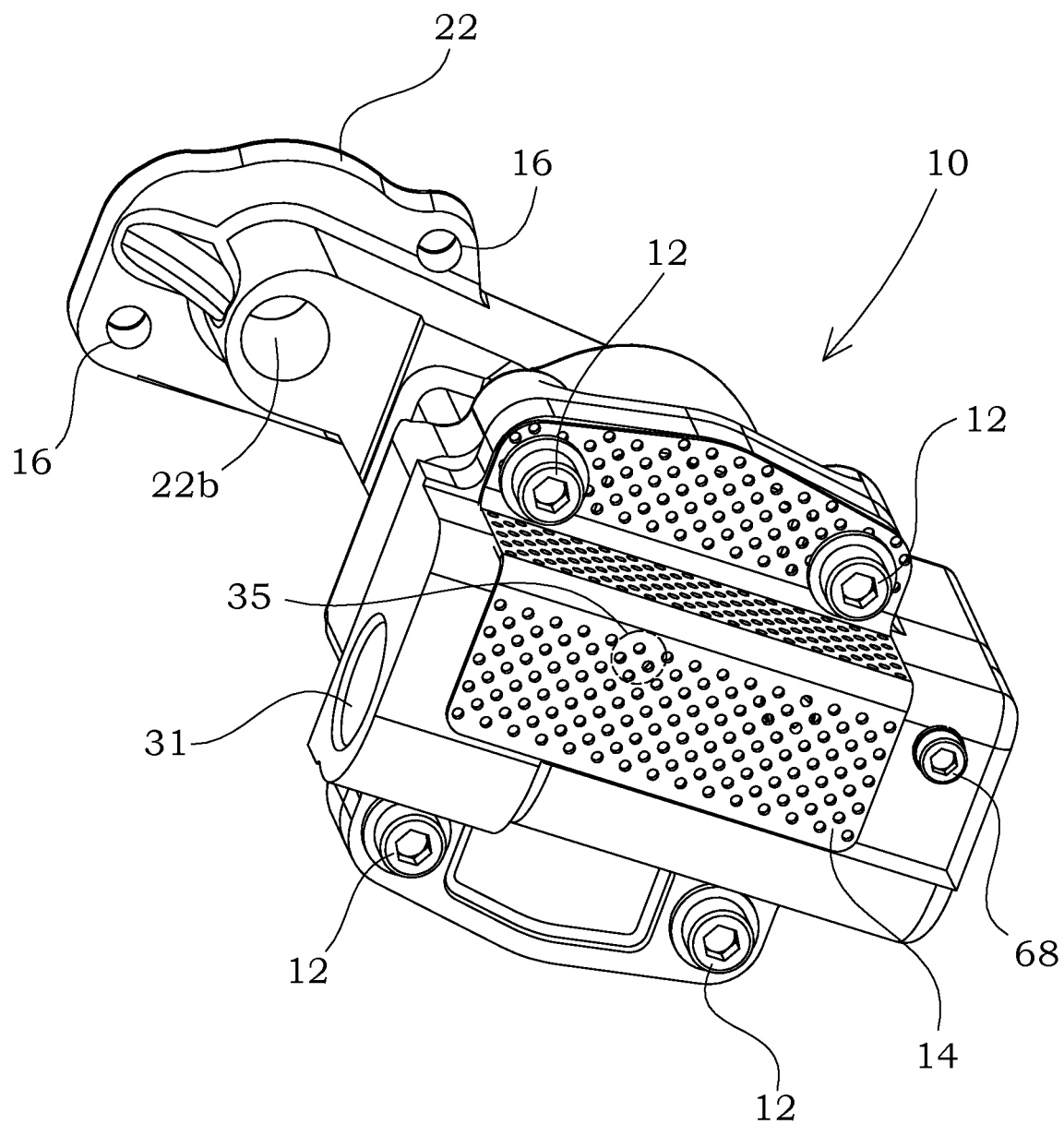
FIG. 2 provides a bottom perspective view of one embodiment of a pump constructed according to the present disclosure.

Referring now to the drawings, wherein like reference numerals designate identical or corresponding parts throughout the several views, FIG. 1 provides elevated perspective view of one embodiment of a pump 10 and/or pump system, and FIG. 2 shows a bottom perspective view thereof. The pump 10 is generally comprised of a main body 20 and a cover housing 30, which are fastened to one another via a plurality of fasteners 12 during use. The specific embodiments of pumps 10 and/or pump systems pictured herein are designed for use as an oil pump for an internal combustion engine. However, several aspects of pumps 10 and/or components thereof may be used with other types of pumps 10, and accordingly, the present disclosure is not limited to a specific type of pump 10 and/or pump system or applications thereof.

Figure 4:
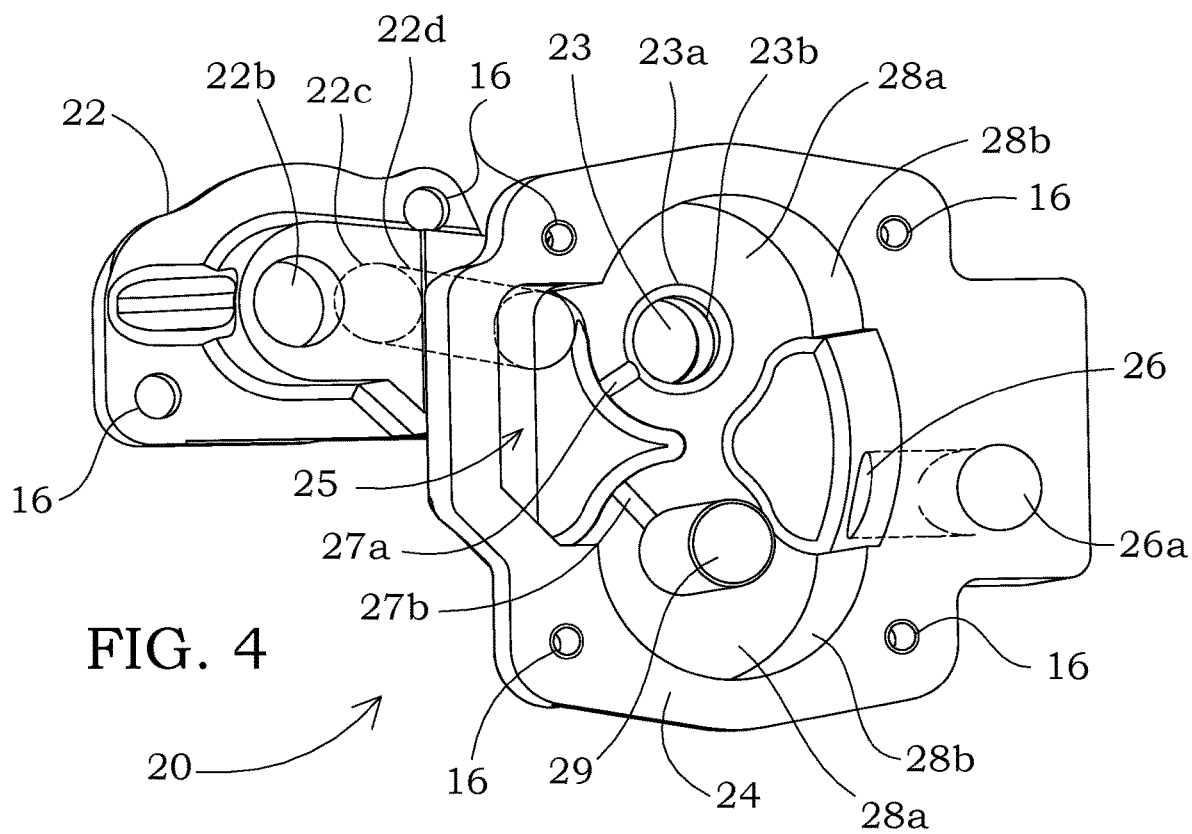
FIG. 4 provides a detailed view of the internal side of one embodiment of a main body constructed according to the present disclosure.

The internal portion of the main body 20 for one gear-to-gear embodiment of the pump 10 is shown in FIG. 4. Referring now to FIGS. 1, 2, and 4, it will be seen that in this embodiment a mounting base 22 extends from the main body. In the embodiment of the pump 10 pictured herein, the mounting base 22 serves to mount the pump 10 to a secure structure, which is typically the engine block of an internal combustion engine in a manner similar to that disclosed in U.S. Pat. No. 3,057,434, which is incorporated by reference herein in its entirety. In such pumps 10 an outlet interface 22a may be fashioned in the mounting base 22 to provide an interface between the pump 10 and the structure to which the pump 10 is mounted. The outlet interface 22a in the embodiment of the main body 20 pictured herein surrounds a pump outlet port 22c through which pressurized fluid exits the main body 20. The pump outlet port 22c is fluidly connected to the gear chamber 25 via a pump outlet passage 23 (shown in FIG. 4) fashioned as an internal channel in the main body 20 and may be formed in a portion of the mounting base 22.

A mounting passage 22b may be fashioned in the mounting base 22 to provide for a fastener 12 that engages both the pump 10 and the structure to which the pump 10 is mounted. In the particular embodiment pictured herein, a pump outlet port 22c is positioned within the periphery of the outlet interface 22a and adjacent the mounting passage 22b. The pump outlet port 22c is in fluid communication with a pump outlet passage 22d formed in the main body 20, which pump outlet passage 22d is in fluid communication with the gear chamber 25 of the main body 20 as previously described. Other mounting methods and/or structures may be used for the pump 10 according to the present disclosure. Accordingly, the scope of the pump 10 as disclosed and claimed herein is not limited by the particular mounting method and/or structure used to mount the pump 10 and/or pump system.

A gasket (not shown) may be positioned between the outlet interface 22a and the structure to which the pump 10 is mounted. A copper gasket may be especially useful for sealing the outlet interface 22a and the structure to which the pump 10 is mounted because it is malleable enough that the copper gasket material will form to imperfections in either the outlet interface 22a and/or structure to which the pump 10 is mounted, yet the copper gasket resists degradation due to heat and/or pressure because of the intrinsic properties of copper. A copper gasket may be configured for use with any embodiment of a pump, including the pump 10 shown in FIG. 1 and the rotary pump 80 shown in FIG. 7A. It is contemplated that the periphery of a copper gasket configured for the pump 10 shown in FIG. 1 will follow the shape and dimensions of the outlet interface 22a. However, the copper gasket may be used with any outlet interface 22a, and therefore the size and/or dimensions thereof are in no way limiting to the scope of the copper gasket.

The internal portion of the main body 20 includes a gear chamber 25, which is best shown in FIG. 4. A cover housing interface surface 24 surrounds the periphery of the gear chamber 25 and provides a surface for sealing the main body 20 to the cover housing 30. In the pictured embodiment, four apertures 16 are fashioned in the main body 20 at various positions around the cover housing interface surface 24. The four apertures 16 in the main body 20 correspond to four apertures 16 in the cover housing 30 (best shown in FIGS. 3A and 3B), and four fasteners 12. The fasteners 12 may be configured as bolts in the embodiment pictured herein, and may be inserted into the corresponding apertures 16 in the main body 20 and the cover housing 30 to secure the main body 20 and the cover housing 30 to one another. Other types of fasteners may be used without limitation.

Sealing material, such as a gasket, o-ring linelar, or silicon rubber, may be placed between the main body 20 and the cover housing 30 at the cover housing interface surface 24 to enhance the seal there between. If an o-ring (not shown) is used, the cover housing interface surface 24 and/or main body interface surface 33 may be formed with a groove (not shown) therein that is shaped similarly to the periphery of the main body 20, into which groove the o-ring may seat. The groove may be curved or square in cross-sectional shape and the cross-sectional shape of the o-ring may compliment that of the groove.

Figure 5A:
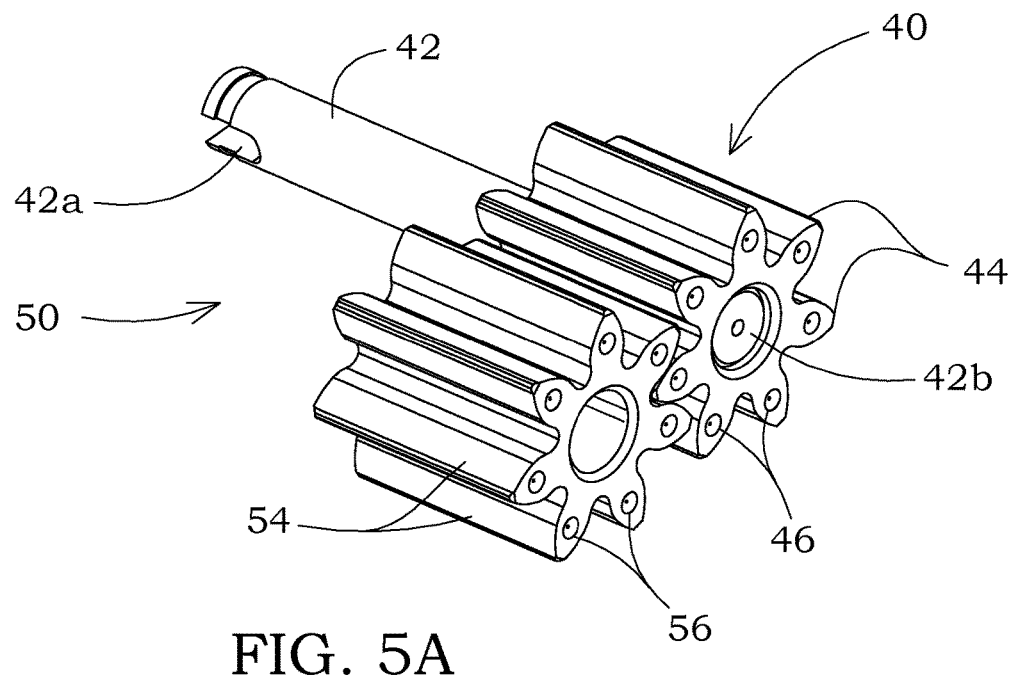
FIG. 5A provides a perspective view of one embodiment of a drive gear and idler gear constructed according to one aspect of the present disclosure.
Figure 5B:
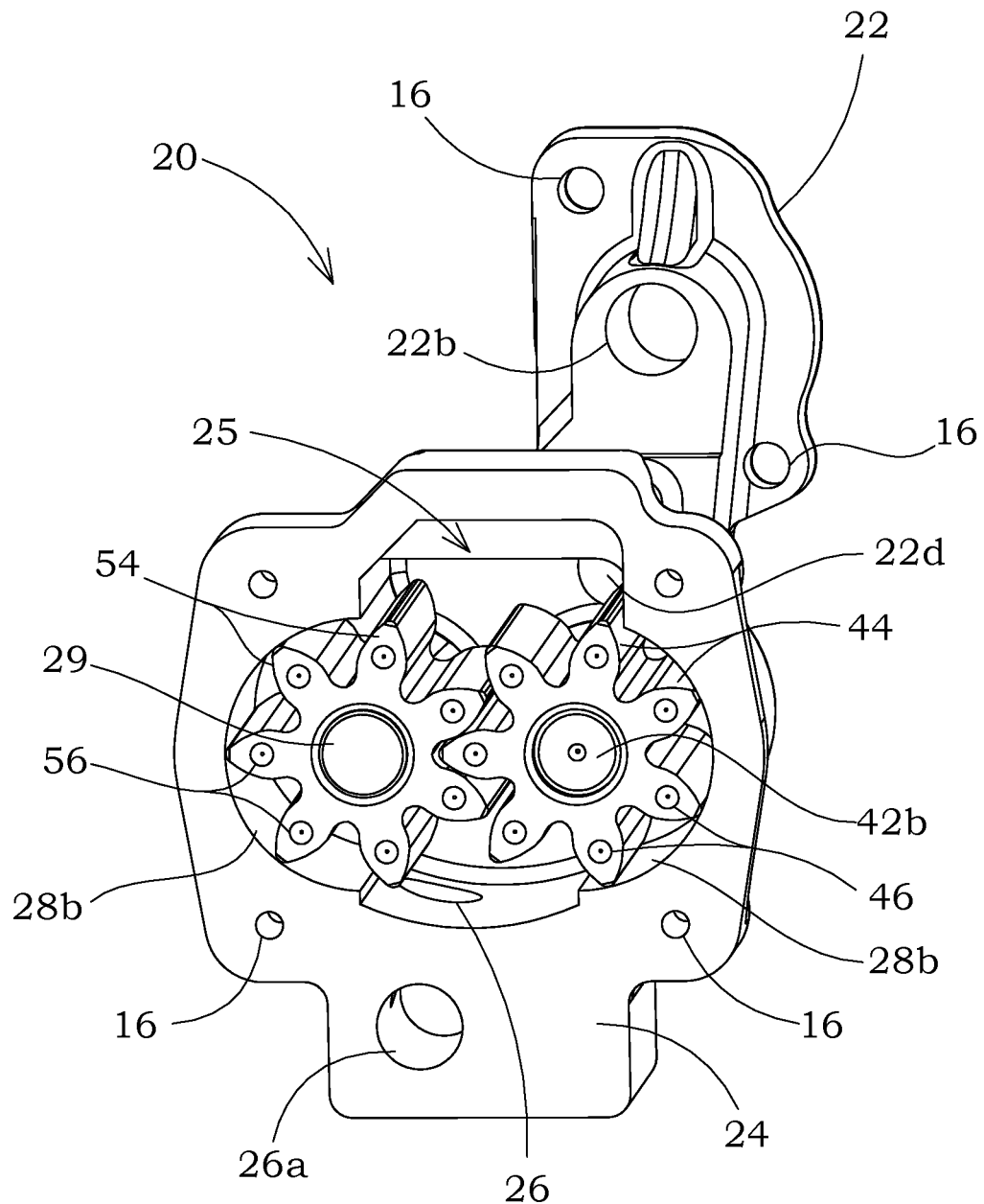
FIG. 5B provides a perspective view of one embodiment a drive gear and idler gear constructed according to one aspect of the present disclosure positioned in one embodiment of a main body.
Figure 6A:
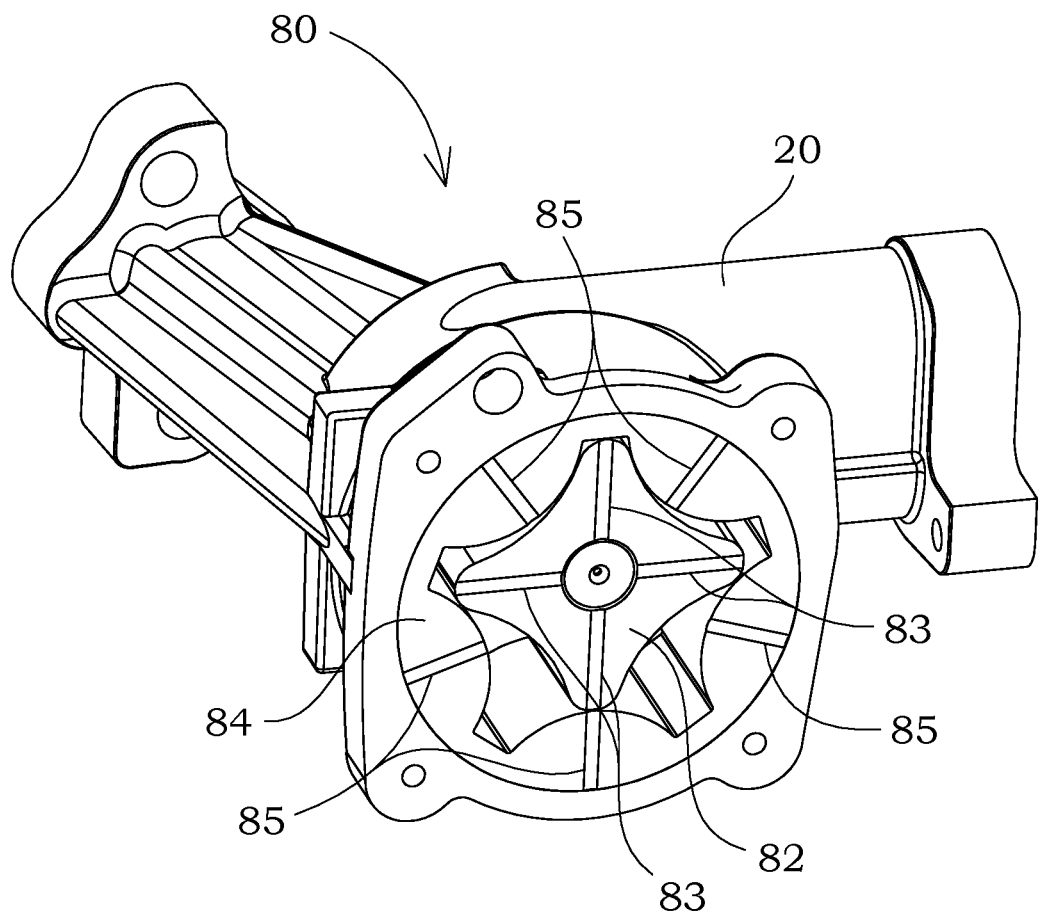
FIG. 6A provides a perspective view of a first embodiment of a rotary pump gear set constructed according to one aspect of the present disclosure positioned in one embodiment of a main body.
Figure 6B:
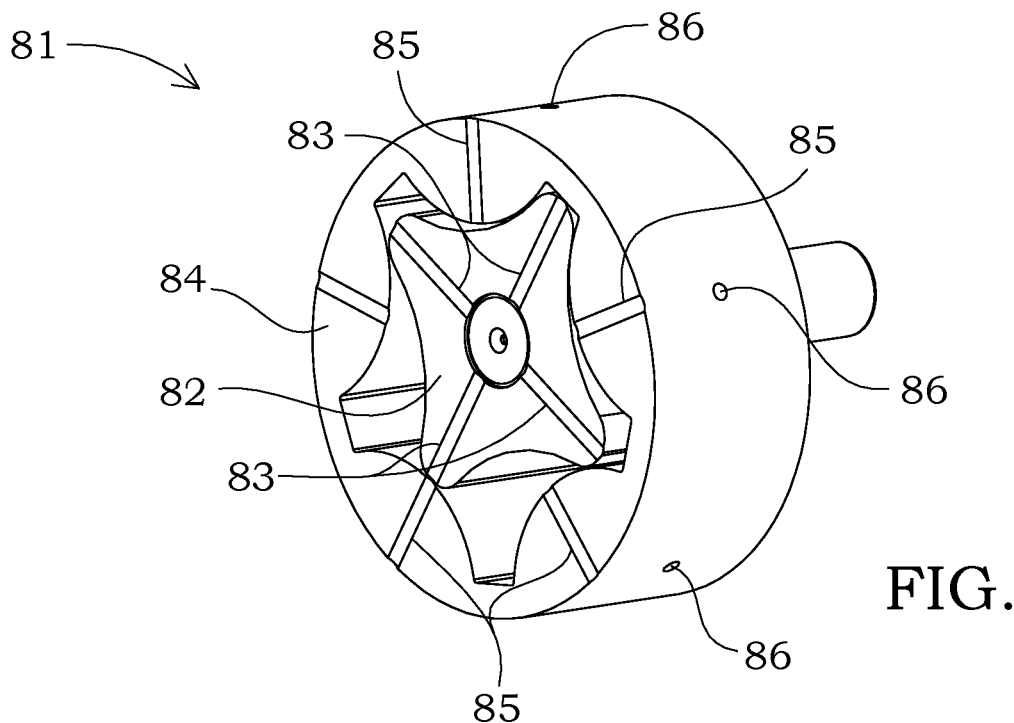
FIG. 6B provides a perspective view of the first embodiment of a rotary pump gear set constructed according to one aspect of the present disclosure.
Figure 6C:
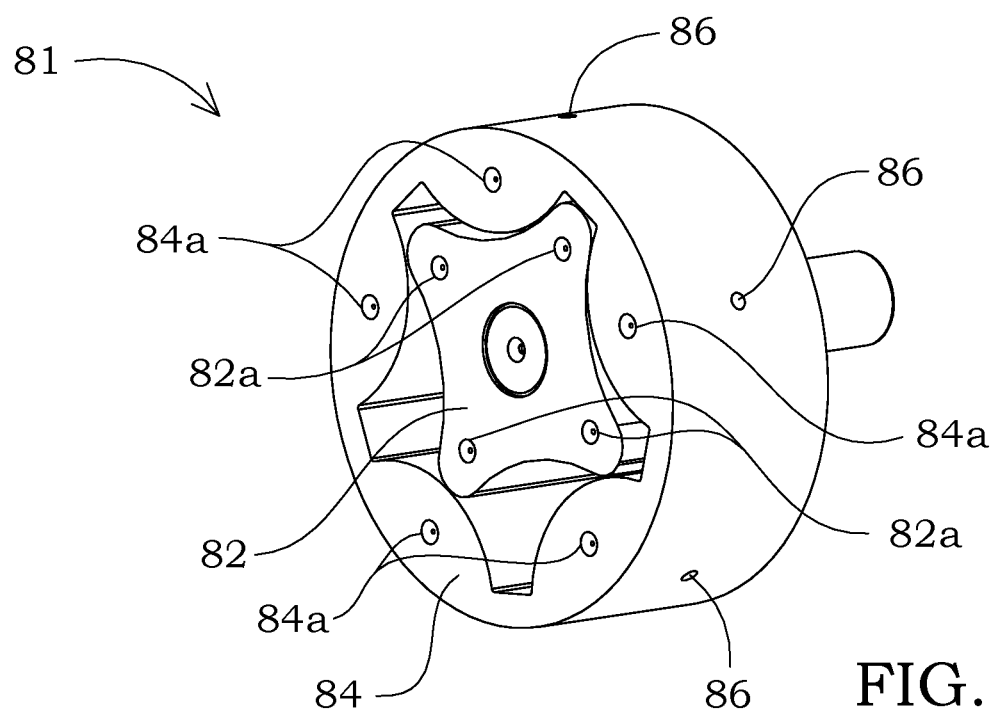
FIG. 6C provides a perspective view of a second embodiment of a rotary pump gear set constructed according to one aspect of the present disclosure.

A drive gear 40 and an idler gear 50, such as those shown in FIG. 5A, may be positioned in the gear chamber 25 (as shown in FIG. 5B) to energize fluid positioned in the gear chamber 25. A drive gear shaft 42 may be fixedly attached to the drive gear 40. The drive gear shaft 42 is disposed in the drive gear shaft bore 23 when the pump 10 is assembled. The drive gear shaft 42 includes a drive gear shaft connector 42a on the upper end thereof, which protrudes from the main body 20 as shown in FIG. 1. A rotational power source (not shown) may be operatively engaged with the drive gear shaft 42 at the drive gear shaft connector 42a. The drive gear shaft lower end 42b is positioned adjacent an axial face of the drive gear 40 as shown in FIG. 5B. As will be apparent to those skilled in the art in light of the present disclosure, as the drive gear 40 rotates, the intermeshing of the drive gear teeth 44 with the idler gear teeth 54 causes the idler gear 50 to rotate in a direction opposite to that of the drive gear 40. The idler gear 50 may be disposed for pivotal engagement with an idler gear shaft 29, which idler gear shaft 29 may be rigidly mounted to the main body 20 as shown in FIG. 4. In other embodiments of the pump 10 not pictured herein (such as that disclosed in U.S. Pat. No. 5,810,571, which is incorporated by reference herein in its entirety) the idler gear shaft 29 is pivotally mounted to the main body 20 and the idler gear 50 is fixedly mounted to the idler gear shaft 29.

Referring now to FIG. 4, one axial surface of the drive gear 40 interfaces the main body 20 at the axial gear interface surface 28a adjacent the drive gear shaft bore 23, and one axial surface of the idler gear 50 interfaces the main body 20 at the axial gear interface surface 28a adjacent the idler gear shaft 29. The radial surface of the drive gear 40 interfaces the main body 20 at the radial gear interface surface 28b adjacent the drive gear shaft bore 23, and the radial surface of the idler gear 50 interfaces the main body 20 at the radial gear interface surface 28b adjacent the idler gear shaft 29. An oil feed drive gear trough 27a and an oil feed idler gear trough 27b may be positioned in the respective axial gear interface surfaces 28a to allow oil positioned in the gear chamber 25 to migrate between one axial surface of the drive gear 40 and idler gear 50 and the main body 20.

In one embodiment of the main body 20, a chamfer relief 23a is fashioned in the drive gear shaft bore 23 adjacent the axial gear interface surface 28a, which is shown in FIG. 4. The chamfer relief 23a allows oil positioned in the gear chamber 25 to migrate into the drive gear shaft bore 23 and subsequently lubricate the interface between the outer surface of the drive gear shaft 42 and the drive gear shaft bore 23. For even further lubrication, a drive gear shaft bore groove 23b may be fashioned in the drive gear shaft bore 23. In the embodiment shown in FIG. 4, the drive gear shaft bore groove 23b is formed primarily as a continuous spiral groove or rifling along the length of the drive gear shaft bore 23. This allows oil located in the gear chamber 25 to migrate from the interior end of the drive gear shaft bore 23 (adjacent the drive gear 40) to the exterior of the main body 20 (adjacent the drive gear shaft connector 42a), thereby lubricating the entire interface between the drive gear shaft 42 and drive gear shaft bore 23. In other embodiments not pictured herein, the drive gear shaft bore groove 23b may consist of a plurality of continuous grooves along the length of the drive gear shaft bore 23 or a portion thereof.

The main body 20 may be formed with a radial inlet port 26 adjacent the two radial gear interface surfaces 28b as best shown in FIG. 4. The radial inlet port 26 is in fluid communication with a radial inlet port passage 26a formed in the main body 20. The radial inlet port passage 26a extends to the cover housing interface surface 24 where it interfaces and is in fluid communication with a radial inlet port feed passage 36a formed in the cover housing 30, which is described in detail below. The radial inlet port 26 provides fluid to the inlet portion of the gear chamber 25 along the radial surface of the drive and idler gears 40, 50, which allows the pump 10 to achieve a higher volumetric flow rate than the same pump 10 not configured with a radial inlet port 26. Testing has shown an increased volumetric flow rate of approximately forty percent (40%) in pumps 10 fashioned with a radial inlet port passage 26a compared to pumps 10 not having a radial inlet port passage 26a, but otherwise identical.

Figure 3A:
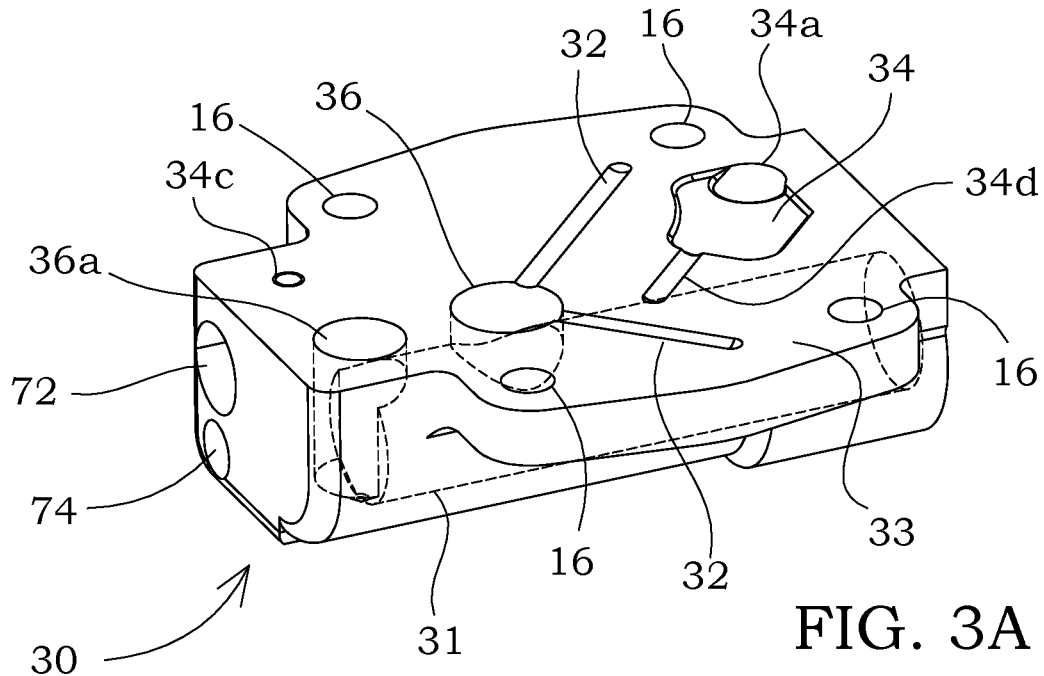
FIG. 3A provides a detailed side view of the internal side of one embodiment of a cover housing constructed according to the present disclosure.
Figure 3B:
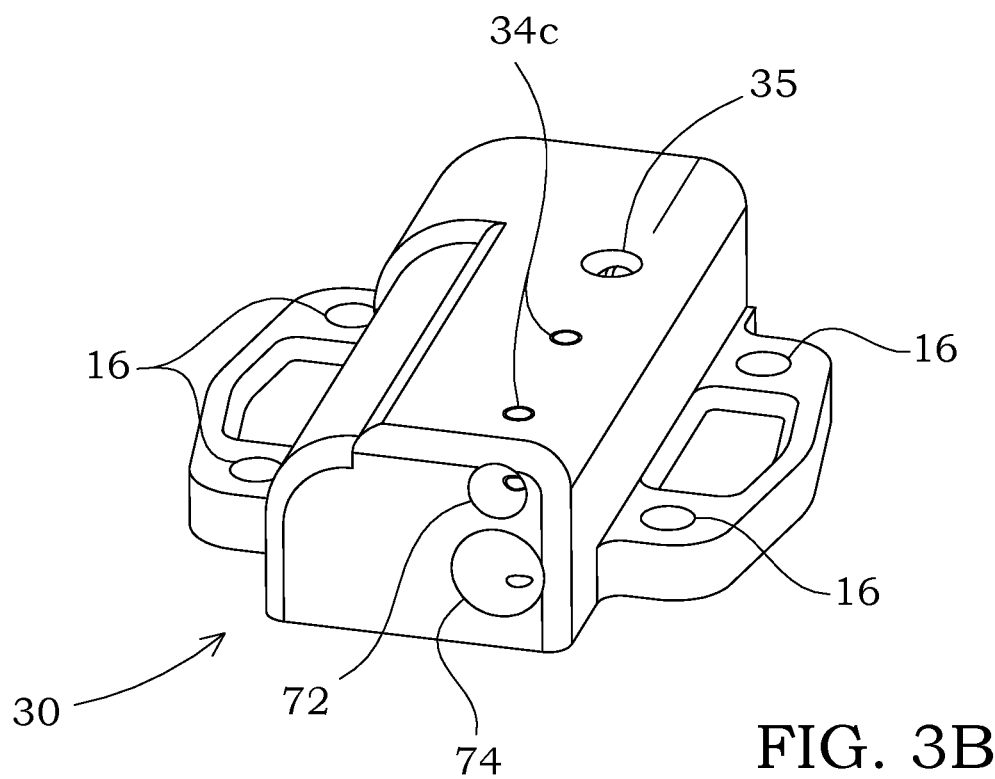
FIG. 3B provides a detailed perspective view of the external surface of one embodiment of a cover housing constructed according to the present disclosure.

A detailed view of the internal surface of the cover housing 30 is shown in FIG. 3A, and a detailed view of the external surface thereof is shown in FIG. 3B. The portion of the internal surface of the cover housing 30 that contacts the main body 20 is referred to as the main body interface surface 33 and may be essentially a mirror image of the cover housing interface surface 24. An inlet channel 31 is formed in the cover housing 30, the external portion of which may be formed as a pick-up tube interface 31a (best shown in FIGS. 1 and 2). Supply fluid is provided to the pump 10 via the inlet channel 31, which supply fluid may be oil from an oil sump located within an internal combustion engine.

Referring now to FIG. 3A, an axial inlet port 36 is in fluid communication with the inlet channel 31 and provides inlet fluid to the axial surface of the drive and idler gears 40, 50 when the pump 10 is assembled. A plurality of anticavitation grooves 32 may extend from the axial inlet port 36 to supply fluid to the axial surface of the drive and idler gears 40, 50 adjacent the cover housing 30 and to ensure that the pump 10 does not cavitate in situations of changing flow rates and/or pressures. A radial inlet port feed passage 36a may be fashioned in the main body interface surface 33, which radial inlet port feed passage 36a corresponds to the radial inlet port passage 26a formed in the cover housing interface surface 24 of the main body 20. Accordingly, supply fluid may pass from the pick-up tube interface 31a through the inlet channel 31 to the radial inlet port feed passage 36a in the cover housing 30 to the radial inlet port passage 26a in the main body and through the radial inlet port 26 to the gear chamber 25 in the main body 20 and encounter the drive and idler gears 40, 50 on the radial surface thereof. Additionally, supply fluid may pass from the pick-up tube interface 31a through the inlet channel 31 to the axial inlet port 36 in the cover housing 30 and encounter the drive and idler gears 40, 50 on an axial surface thereof such that the drive and idler gears 40, 50 are supplied with fluid from two distinct surfaces and/or sources for increased volumetric flow of the pump 10.

Figure 3C:
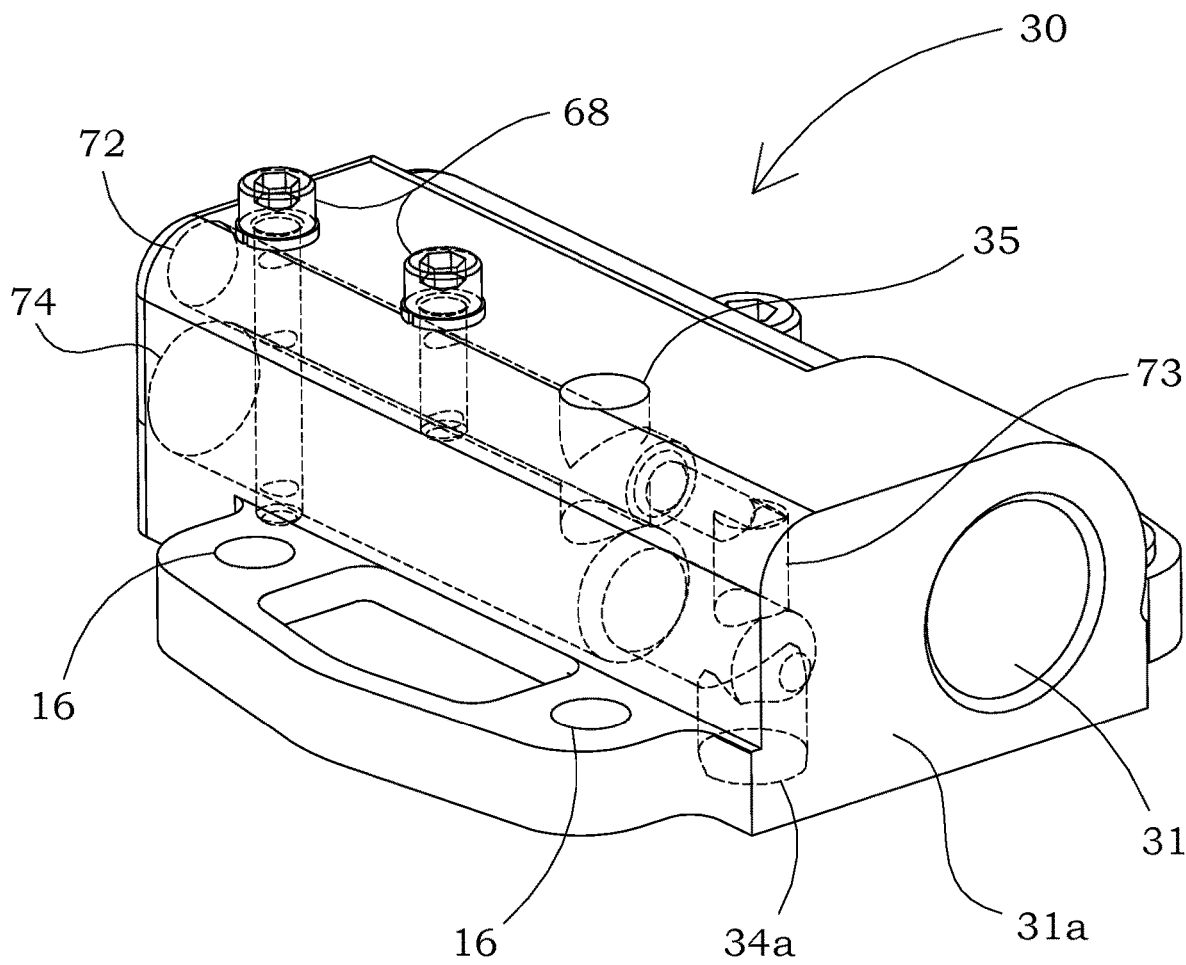
FIG. 3C provides a detailed view of one embodiment of a cover housing showing various internal elements as hidden lines.

The cover housing 30 also may be formed with a pressure relief inlet cavity 34 opposite the radial inlet port feed passage 36a. A plurality of pressure relief inlet cavity troughs 34d may extend from the pressure relief inlet cavity 34 to provide fluid to the axial surface of the drive and idler gears 40, 50 adjacent the cover housing 30 and to direct pressurized fluid within the gear chamber 25 to the pressure relief inlet 34a. A pressure relief inlet 34a may be positioned adjacent the pressure relief inlet cavity 34 for fluid communication with a first pressure relief channel 72. In one embodiment of the cover housing 30 the first pressure relief channel 72 is oriented parallel to the inlet channel 31, as best shown in FIG. 3C, which shows various internal elements of one embodiment of a cover housing 30 as hidden lines, and in which certain mechanical elements have been removed for purposes of clarity. The first pressure relief channel 72 may extend through the exterior wall of one side of the cover housing 30 as shown in FIGS. 3A and 3B, but one end of the first pressure relief channel 72 may be sealed. A pressure relief outlet 35 may be fashioned in the side of the cover housing 30 so that it is in fluid communication with the pressure relief channel 34b during predetermined conditions of sufficient pressure within the gear chamber 25.

One or more pressure relief retainer channels 34c may be fashioned to intersect the pressure relief channel 34b and engage a spring retainer 68, which is described in detail below. In the embodiments pictured herein, the spring retainer 68 is threaded to engage a tapped pressure relief retainer channel 34c. However, in other embodiments the spring retainer 68 and/or pressure relief retainer channel 34c are smooth or are engaged with one another using a structure and/or method other than threads. Accordingly, the spring retainer 68 may be engaged with the cover housing 30 through any method and/or structure known to those skilled in the art without limitation.

Figure 3D:
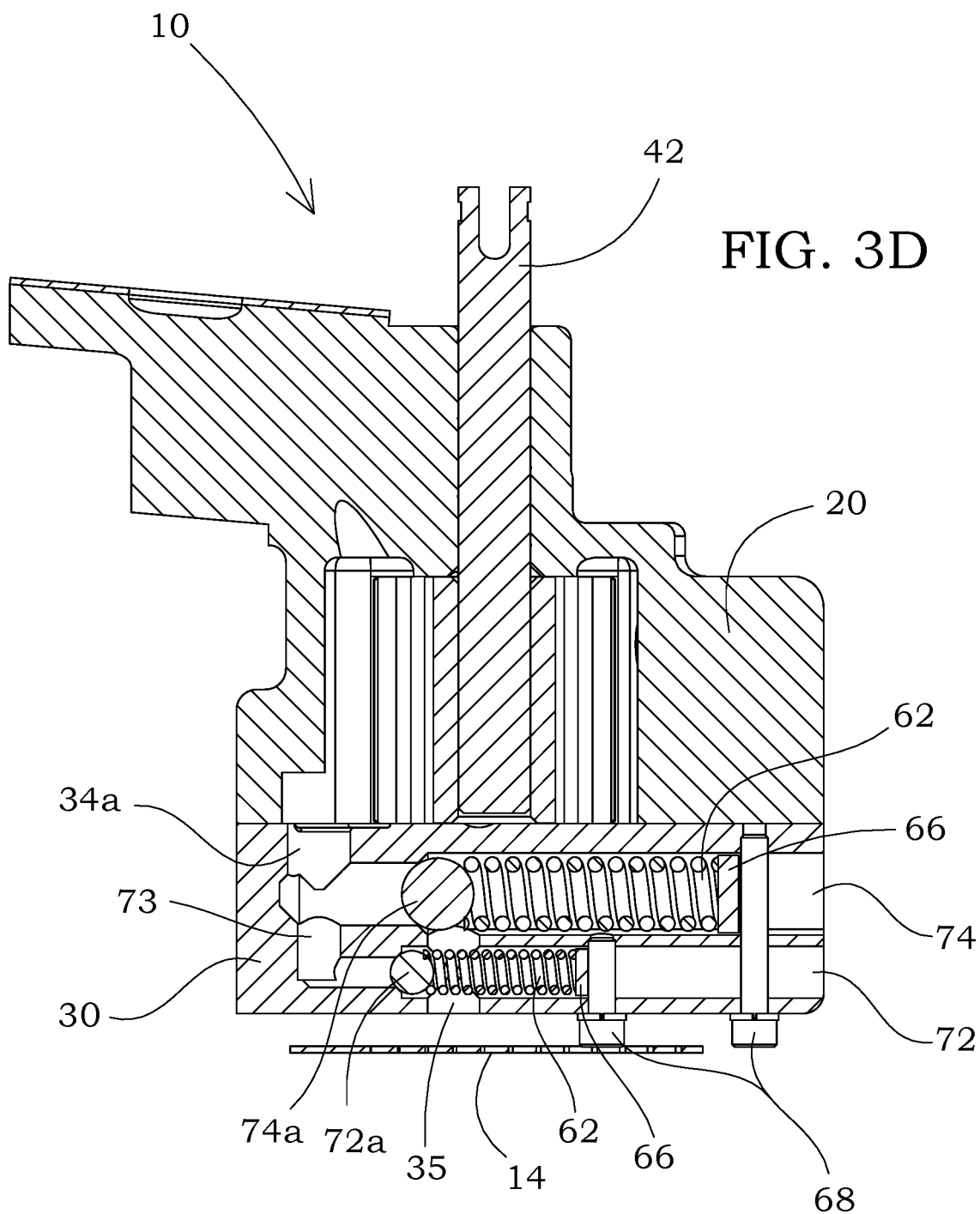
FIG. 3D provides a detailed cross-sectional view of one embodiment of a pump constructed according to the present disclosure.

A pressure relief assembly comprising a spring 62, valve 64, and spring connector 66 (as shown in FIG. 3D, which provides a cross-sectional view of one embodiment of the pump 10) may be engaged with one of the pressure relief channels 72, 74 of the cover housing 30 to allow pressurized fluid to be expelled from the gear chamber 25 via a conduit other than the pump outlet passage 22d upon certain predetermined conditions. Generally, the spring 62, valve 64, and spring connector 66, may be disposed in the first pressure relief channel 72 and sized such that when the pump 10 is operating in a desired differential pressure range, the valve 64 prevents pressurized fluid within the gear chamber 35 from exiting through the pressure relief outlet 35. The valve 64 is positioned adjacent the pressure relief outlet 35, followed by the spring 62 and the spring connector 66. The spring retainer 68 in conjunction with the spring 62 and spring connector 66 may serve to bias the valve in a direction toward the pressure relief outlet 35.

In the embodiments pictured herein, the spring retainer 68 is fashioned as a bolt, but may be any structure known to those skilled in the art that is suitable for the particular application of the pump 10 and/or pump system. The amount of force by which the spring 62 resists compression determines the pressure within the gear chamber 25 that will cause the valve 64 to open and allow pressurized fluid to exit the gear pump 10 via the pressure relief outlet 35. In the embodiments pictured herein, it is contemplated that the spring connector 66 may be fashioned as a washer, solid plate, or otherwise. These spring connectors 66 may serve as shims so that the assembly height of the pressure relief assembly 60 may be fine tuned for optimal performance thereof.

In certain embodiments it may be beneficial to offer a plurality of springs 62 of differing resistance so that the pressure at which the pressure relief assembly allows fluid to exit the main body 25 through the pressure relief outlet 35 may be adjusted by the user. The different springs 62 may be color-coded to correspond to a specific relief pressure. The spring 62 may be removed by disengaging the spring retainer 68 from the pressure relief retainer channel 34c and removing the spring connector 66 (best shown in FIG. 3D) to access the spring 62. A diffuser screen 14 may be positioned over the pressure relief outlet 35, as shown in FIG. 2, so that when the valve 64 opens, the exiting fluid is disbursed in a wide spray pattern rather than a concentrated stream.

In the various embodiments pictured herein, the valve 64 in the pressure relief assembly 60 is fashioned as a ball valve 64, which is best shown in FIG. 3D. Typical prior art valves 64 are fashioned as plug, cup, or spool valves. The ball valve 64 typically provides superior performance to other types of valves 64 in the presence of any foreign objects, which is common in motor oil applications of internal combustion engines. For example, if a piece of foreign material, such as carbon or paper, encounters the surface of the ball valve 64, the ball may rotate about the end of the spring 62 and/or pressure relief outlet 35 until the foreign material is expelled. Furthermore, the rotation of the ball against the pressure relief outlet 35 may fragment the piece of foreign material or dislodge it from the surface of the ball valve 64. Conversely, because of the leverage on a cylinder-shaped plug, a piece of foreign material positioned on a plug valve 64 often causes the valve 64 to stick in one position and malfunction. This problem is exacerbated by the closer tolerances required between the valve 64 and the pressure relief channel 34b, which may be as little as two thousands of an inch.

The embodiment of the cover housing 30 shown herein also includes a second pressure relief channel 74 fashioned therein and in fluid communication with the pressure relief inlet 34a, although other embodiments may include only a first pressure relief channel 72. A pressure relief assembly analogous to that described above may be positioned in the second pressure relief channel 74. The two pressure relief assemblies may be sized differently volumetrically (e.g., the diameter of the first and second pressure relief channels 72, 74 may be different, as in the embodiment shown) and the springs 62 in each pressure relief assembly may be sized so that the respective valves 64 require different internal pressures in the pump 10 before the respective valve 64 opens.

The first and second pressure relief channels 72, 74 are in fluid communication via a cross channel 73 that extends from the first pressure relief channel 72 and into the second pressure relief channel 74. In this embodiment the pressure relief outlet 35 may be in fluid communication with both pressure relief channels 72, 74, as best shown in FIG. 3D. Each pressure relief channel 72, 74 may have separate and distinct pressure relief outlets 35, or the two pressure relief channels 72, 74 may share a common pressure relief outlet 35.

As is clearly shown in FIG. 3D, the cross-sectional area of the second pressure relief channel 74 is greater than that of the first pressure relief channel 72 by approximately thirty-five percent, but may be different in other embodiments of the cover housing 30 not pictured herein. The first and second pressure relief channels 72, 74 are shown with each having a valve 64 positioned within the respective pressure relief channels 72, 74 in FIG. 3D. It should be noted that during operation the end of the pressure relief channels 72, 74 visible in FIG. 3B would likely be sealed.

It is contemplated that the spring 60 associated with the first pressure relief channel 72 will bias the valve 64 associated therewith by a lesser amount than the amount with which the spring 60 associated with the second pressure relief channel 74 biases the valve 64 associated therewith. That is, less pressure within the pump 10 will be required to open the valve in the first pressure relief channel 72 than the pressure required to open the valve in the second pressure relief channel 74. Because the cross-sectional area of the first pressure relief channel 72 is less than that of the second pressure relief channel 74, a lower volume of pressurized fluid will exit the pump 10 when the valve 64 in the first pressure relief channel 72 is open than when the valve 64 in the second pressure relief channel 74 is open. Accordingly, with properly sized first and second pressure relief channels 72, 74 and springs 62 placed therein, the pump 10 will not be forced to operate with insufficient fluid therein, which typically occurs when a larger valve 64 opens with the engine running at idle or close to idle speeds. Such operating conditions often occur with prior art pumps due to the large volume of pressurized fluid that exits the pump 10 when a pressure bypass valve is opened.

In one embodiment of the cover housing 30 having two pressure relief channels 72, 74, the valve 64 associated with the first pressure relief channel 72 and associated components are sized and configured so that that valve 64 is sensitive to pressures indicative of idle engine speeds for an internal combustion engine and also configured for optimal performance with volumetric flow rates typical of idle engine speeds (2-3 gallons per minute (GPM)). The valve 64 associated with the second pressure relief channel 74 and associated components are sized and configured so that that valve 64 is sensitive to pressures indicative of higher engine speeds and also configured for optimal performance with volumetric flow rates typical of higher engine speeds (4-16 GPM).

The drive and idler gears 40, 50 shown in FIGS. 5A and 5B are each fashioned with an equal number of drive gear and idler gear teeth 44, 54. As is readily apparent, the axial surface of the drive gear 40 visible in FIGS. 5A and 5B (which is the surface of the drive and idler gears 40, 50 that is adjacent the cover housing 30 when the pump 10 is assembled) includes a drive gear tooth dimple 46 in each drive gear tooth 44. Similarly, the visible axial surface of the idler gear 50 includes an idler gear tooth dimple 56 in each idler gear tooth 54. The drive and idler gear tooth dimples 46, 56 provide a pocket for lubricant to migrate to the space between the axial surface of the drive and idler gears 40, 50 and the cover housing 30. This allows more lubricant to migrate to areas of the pump 10 that may be typically high-wear, and thus increase the efficiency and longevity of the pump 10. Testing has shown that drive gear tooth dimples 46 and idler gear tooth dimples 56 may reduce the energy requirement on a thirty-amp motor by as much as five amps. It is contemplated that drive gear tooth dimples 46 and idler gear tooth dimples 56 may be fashioned on each axial surface of both the drive gear 40 and idler gear 50 in certain applications. Typically the drive and idler gears 40, 50 are configured so there is between two and four thousandths-of-an-inch play in the axial dimension between the drive and idler gears 40, 50 and the gear chamber 35. The dimples 46, 56 as shown herein are generally spherically shaped voids, but may have other shapes and/or configurations in embodiments of the pump 10 not pictured herein.

Figure 7A:
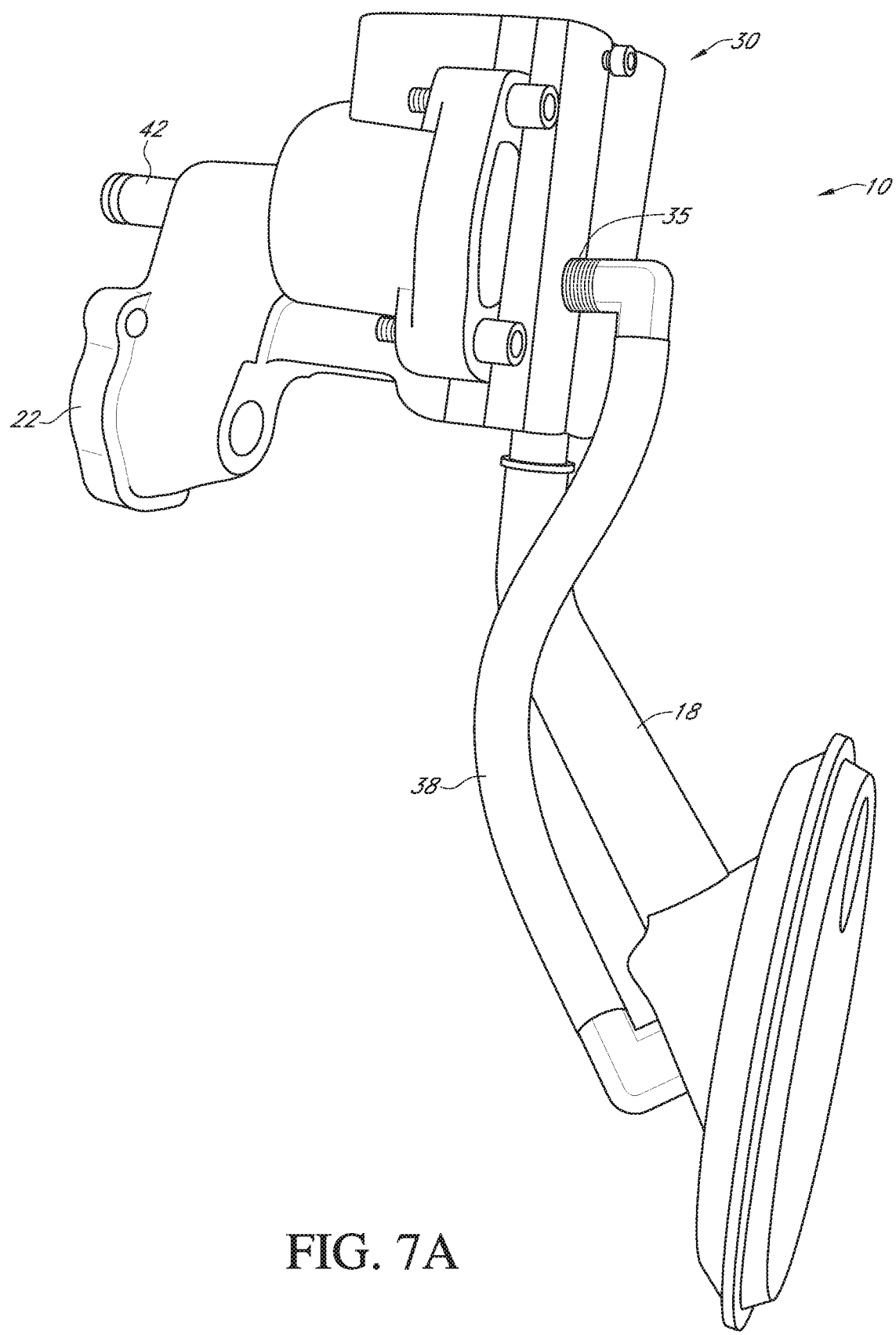
FIG. 7A provides a perspective view of an illustrative embodiment of a pump with a return channel configured therein.
Figure 7B:
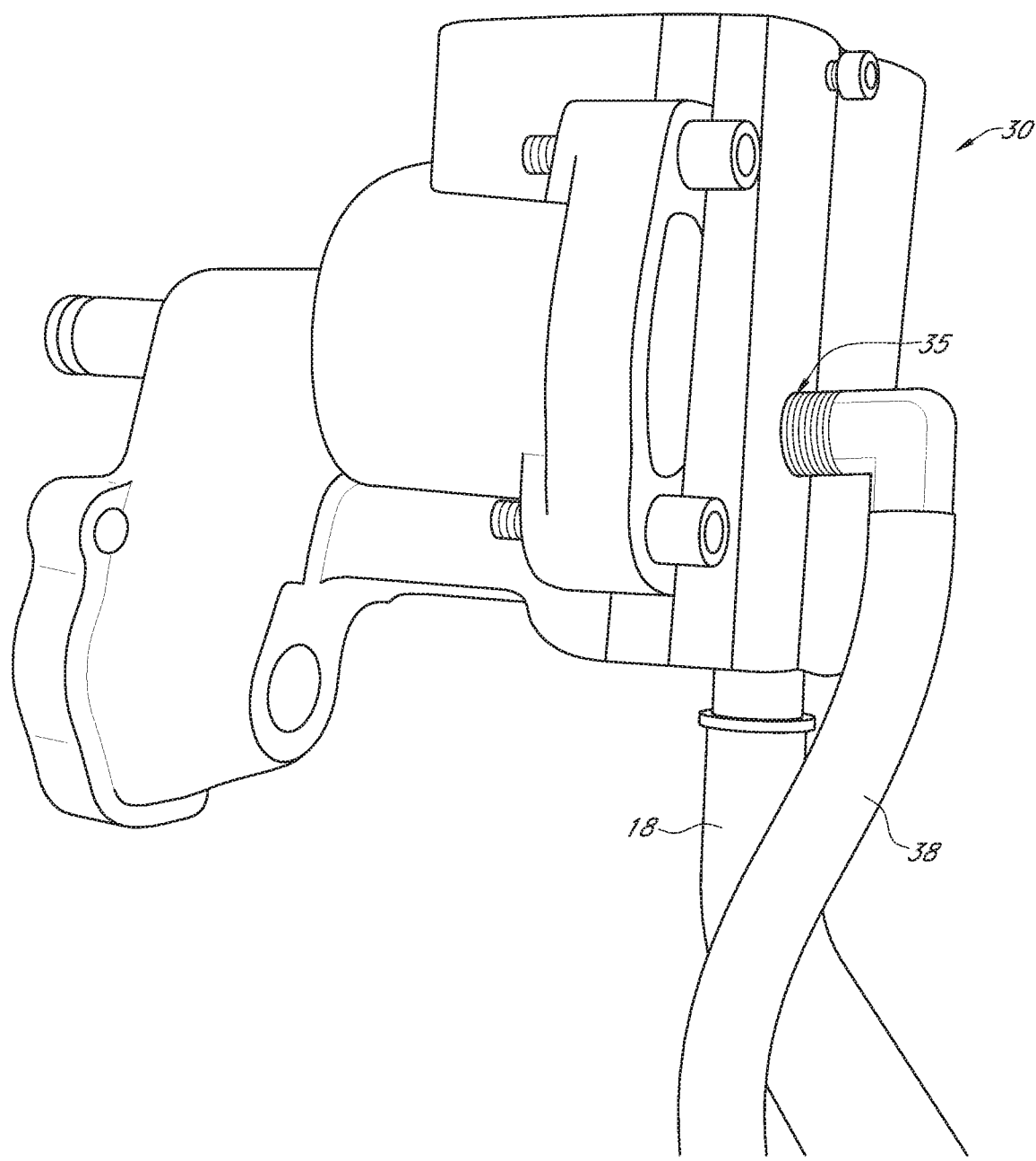
FIG. 7B provides a detailed view of the interface between the cover housing and the return channel.
Figure 7C:
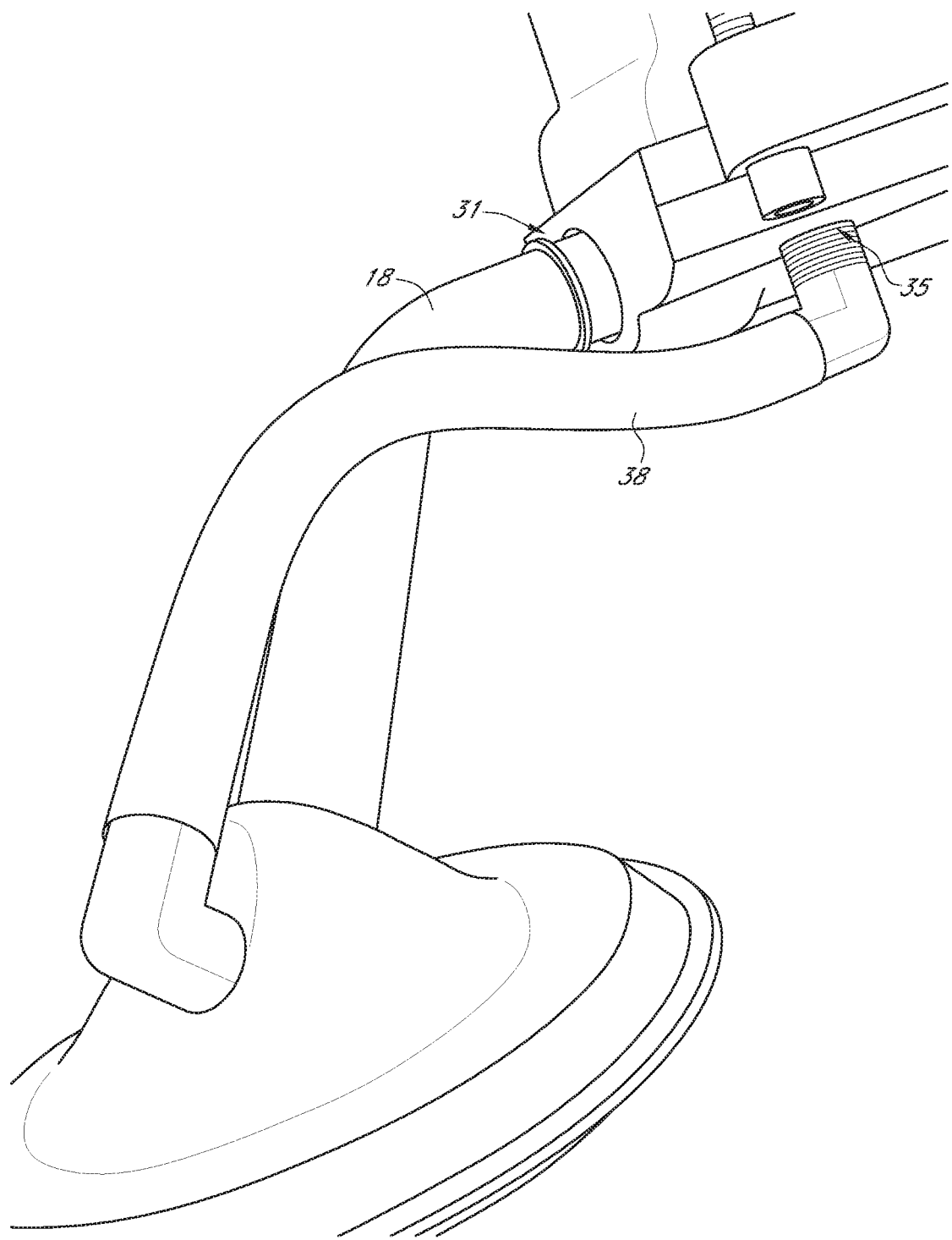
FIG. 7C provides a detailed view of the interface between the pick-up tube and the return channel.

One embodiment of a rotary pump 80 is shown in FIG. 7A, which may also be used with various aspects of the pump 10 as disclosed and claimed herein. Rotary pumps 80 generally include a main body 20 and a rotary gear set 81, which includes at least one rotor gear 82 and a stator ring gear 84 surrounding each rotor gear 82. Two different embodiments of rotary gear sets 81 are shown in FIGS. 7B and 7C, respectively, both of which may be used with the embodiment of the main body 20 shown in FIG. 7A. The rotary gear set 81 shown in FIG. 7C includes rotor dimples 82a fashioned in the axial surface of the rotor gear 82 and stator dimples 84a fashioned in the axial surface of the stator ring gear 84. As with the drive and idler gears 40, 50 as explained above, the rotor and stator dimples 82a, 84a provide cavities into which lubricant may migrate during operation of the rotary pump 80. Pumps 10 other than gear or rotary pumps 80 as pictured and described herein may benefit from fashioning dimples in the rotating and/or stationary components of the pump, such as centrifugal pumps, peristaltic pumps, or any other type of pump 10 known to those skilled in the art. Accordingly, the dimpling method and/or structures as disclosed and claimed herein are not limited by the specific type of pump, pump system, and/or pump component that is configured with dimples.

Another embodiment of a rotary pump gear set 81 is shown in FIG. 7B. The rotor gear 82 as shown in FIG. 7B is fashioned with rotor grooves 83 in an axial surface thereof, and the stator ring gear 84 is fashioned with stator grooves 85 in an axial surface thereof. The rotor grooves 83 and stator grooves 85 cooperate to pressure balance the rotary pump 80 during operation as they facilitate cross flow of pressurized fluid from areas of high fluid volume (such as the bottom portion in FIG. 7B) to areas of low fluid volume (such as the top portion in FIG. 7B). Accordingly, a rotary pump 80 with a rotary pump gear set 81 fashioned with rotor and stator grooves 83, 85 will operate more smoothly and efficiently, and such a pump 10 will have increased longevity. Four rotor and stator grooves 83, 85 are shown in the embodiment pictured in FIG. 7B, but a lesser or greater number of rotor and/or stator grooves 83, 85 may be used in other embodiments of the rotary pump gear set 81 not pictured herein. Furthermore, although the rotor grooves 83 and stator grooves 85 are shown as being oriented at an angle of ninety degrees respective to the adjacent rotor grooves 83 and stator grooves 85, respectively, other orientations may be used depending on the number of rotor and/or stator grooves 83, 85 without departing from the spirit and scope of the pump system as disclosed and pump 10 as claimed herein.

The embodiments of the rotary pump gear set 81 shown in FIGS. 7B and 7C also include a plurality of stator radial bores 86 fashioned in the stator ring gear 84. Each stator radial bore 86 extends from the outer radial surface of the stator ring gear 84 (i.e., the surface of the stator ring gear 84 that interfaces the main body 20, as shown in FIG. 7A) to the inner radial surface thereof (i.e., the surface of the stator ring gear 84 that interfaces the rotor gear 82). The stator radial bores 86 may be positioned in the axial centerline of the stator ring gear 84. The stator radial bores 86 allow a predetermined amount (which amount is dependent at least on the cross-sectional area of the stator radial bores 86) of pressurized fluid from the rotary pump gear set 80 to flow from the area between the rotor gear 82 and stator ring gear 84 to the area between the stator ring gear 84 and the main body. Accordingly, the stator radial bores 86 constantly lubricate the rotary pump 80 with localized high pressure fluid, which increases the efficiency and longevity of a pump 10 so configured. The embodiments shown in FIGS. 7B and 7C include a total of four stator radial bores 86, wherein each stator radial bore 86 is oriented by ninety degrees with respect to adjacent stator radial bores 86. However, in embodiments not pictured herein, a different amount of stator radial bores 86 may be used and the orientation thereof may be different than shown in the embodiments pictured herein.

FIGS. 7A-7C provide several view of an illustrative embodiment of a pump 10 configured with a return channel 38. The return channel 38 may be in fluid communication with the pressure relief outlet 35 formed in the cover housing 30. The return channel 38 may also be in fluid communication with the pick-up tube 18, which pick-up tube 18 may be engaged with the cover housing 30 adjacent the inlet channel 31 as shown in FIG. 7C.

The return channel 38 may serve to communicate and route fluid expelled from the pump 10 via the pressure relief outlet 35 to the pick-up tube 18, and subsequently to the inlet channel 31. Accordingly, under certain conditions a pump 10 configured with a return channel 38 may require less power applied to the drive gear shaft 42 to generate desired flow characteristics (e.g., pressure, temperature, volumetric flow rate, etc.) at the pump outlet passage 22d. Accordingly, in such a pump 10, pressurized fluid discharged through the pressure relief outlet 35 may be routed to the intake side of the pump 10 instead of being returned to the sump. This results in what may be a more energy efficient design. It is estimated that in certain applications a pump 10 configured with a return channel 38 may require from 10-60% less energy to develop equal flow characteristics at the pump outlet passage 22d compared to a similar pump 10 without the return channel 38.

The interface between the pick-up tube 18 and the return channel 38 may be adjusted for optimal performance for a specific application. It is contemplated that in some applications it will be beneficial for that interface to be closer to the distal end of the pick-up tube 12 as a larger volume of fluid may be present in the pick-up tube 12 upstream to the interface as compared to an interface located close to the inlet channel 31. Additional fluid volume may act as a buffer in certain operating conditions that might otherwise lead to inadequate fluid volume on the intake side of the pump 10.

Additionally, it is contemplated that in some applications it will be desirable to have the return channel 38 configured so that fluid exiting the return channel 38 is traveling generally parallel to fluid within the pick-up tube 12 during operation (i.e., toward the inlet channel 31). In some embodiments this will require a U-shaped (or fish hook) adaptor between the return channel 38 and the pick-up tube 18 as opposed to the 90 degree elbow shown in the illustrative embodiment. The outlet of this adaptor may be positioned directly in the center of the pick-up tube 18 on the interior thereof.

In another embodiment of a pump 10 configured with a return channel 38, the pick-up tube 18 and the return channel 38 may be cast into an integral piece having a first bore to serve as an pick-up tube 18 and a second bore to serve as a return channel 38. One end such an integrated structure may be configured to engage both the inlet channel 31 (at the pick-up tube 18 bore) and pressure relief outlet 35 (at the return channel 38 bore). Alternatively, the return channel 38 and pick-up tube 18 may be rigid parallel tubes, which may or may not be engaged with one another for purposes of structural rigidity and/or robustness. Any embodiment may use a return channel 38 cast into a housing, tubular metallic metal, and/or high-pressure synthetic material.

It is further contemplated that the cover housing 30 may be configured to better accommodate such an embodiment, wherein the pressure relief outlet 35 may be located adjacent the inlet channel 31 by the pick-up tube interface 31a (FIG. 3C). Accordingly, the return channel 38 and pick-up tube 18 may be secured to the pump 10 at a single location.

A pump 10 configured with a return channel 38 may have several advantages over similar pumps 10 without a return channel 38. For example, a return channel 38 may: (1) enhance the intake suction flow to the gear chamber 25 by providing a pressurized flow to the inlet channel 31; (2) promote additional fluid flow aiding atmospheric pressure and suction of oil pump gears 40, 50 in mesh; (3) transition operational engine horsepower from wasted energy to applied recycled closed loop pressurized oil stream to the intake side of the pump; (4) benefit the sump oil pool depth with pick-up tube 18 submerged because the oil injected into the intake side of the pump 10 is not dependent on gravity to drain into sump to be available for the pick-up tube 18, which may be especially useful in vehicles and/or operational situations in which the orientation of the pump 10 changes (e.g., off road use, aviation, etc.); and, (5) increase engine horsepower efficiency because spent volumetric pressurized oil is redirected into a closed loop energy system on the intake side of the pump 10.

Another embodiment of a rotary pump 80 having certain features according to the present disclosure is shown in FIGS. 8A-10B. It is contemplated that the type of rotary pump 80 shown in FIGS. 8A-10B may be configured for use as an oil pump for internal combustion engines, wherein the rotary pump 80 may receive rotational energy from a crankshaft of the engine. Additionally, the illustrative embodiment of a rotary pump 80 shown in FIGS. 8A-10B may be configured such that it is may be mounted to the front of the engine such that generally the surface shown in FIG. 8C is positioned facing the engine block and the surfaces shown in FIGS. 8A, 8B, and 9-10B are positioned such that they do not face the engine block. However, other uses and/or orientations for the rotary pump 80 exist, and therefore the scope of the present disclosure is in no way limited by the specific application for which a rotary pump 80 is designed.

Figure 8A:
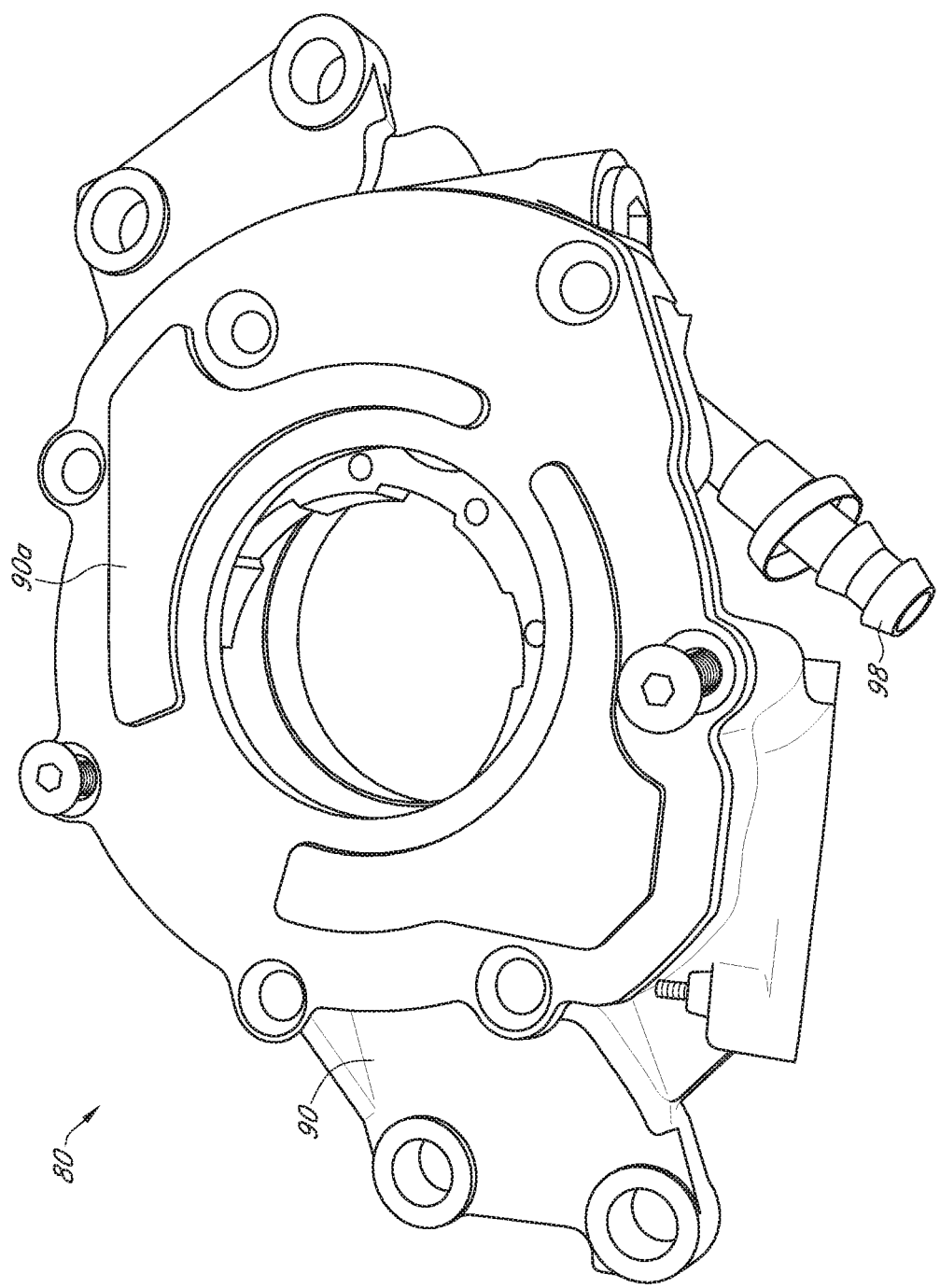
FIG. 8A provides a front perspective view of an illustrative embodiment of a pump configured with an energy recovery system.
Figure 8B:
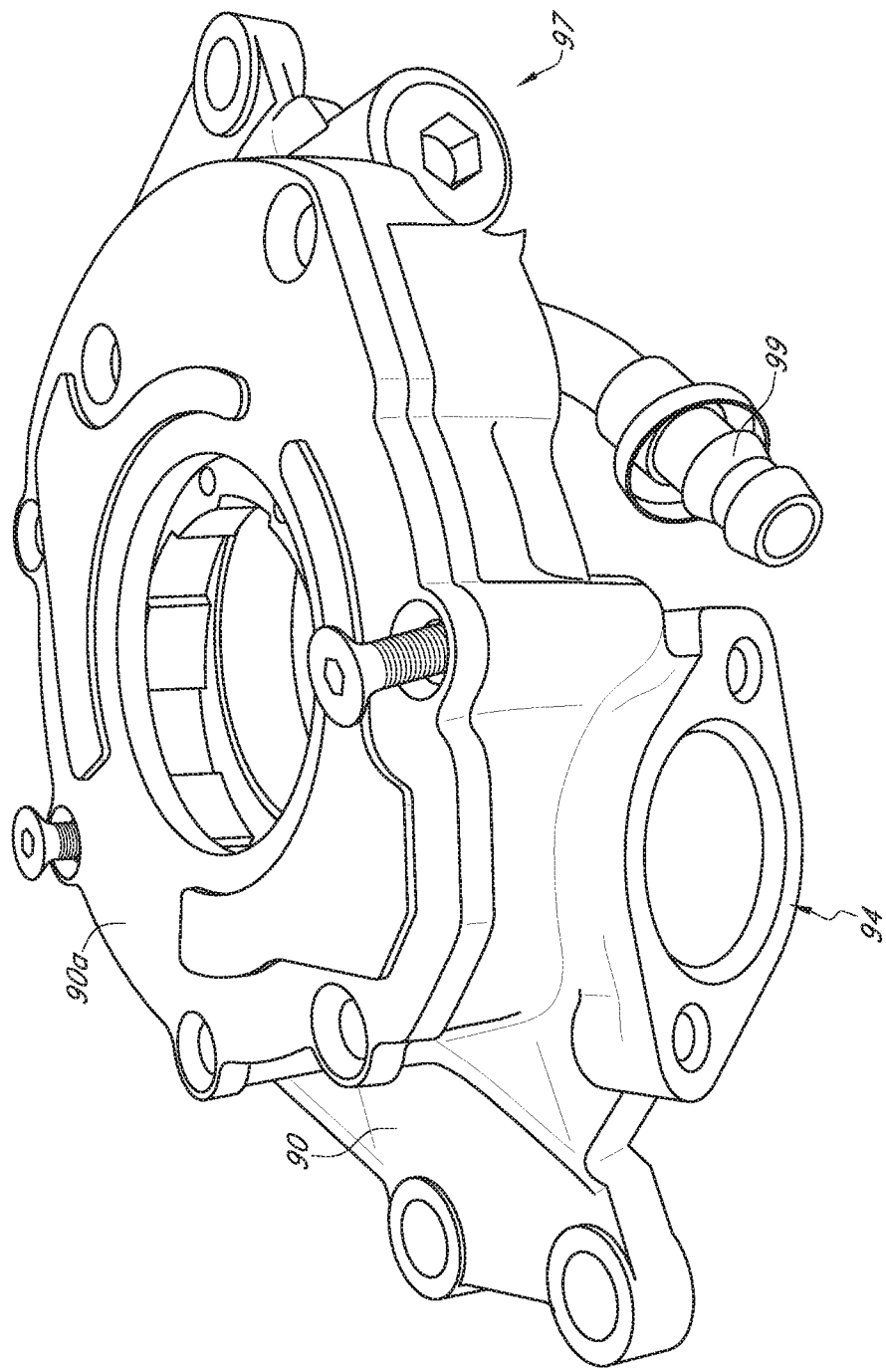
FIG. 8B provides a lower front perspective view of the illustrative embodiment shown in FIG. 8A.

As shown in FIG. 8A, an illustrative embodiment of a rotary pump 80 may comprise a rotary cover 90a that is selectively engageable with a rotary housing 90. The illustrative embodiment of a rotary pump 80 may be configured with an inlet 94, which may be formed in the rotary housing 90. The illustrative embodiment may also include a pressure relief portion 97, which may be positioned within or adjacent to the rotary housing 90. A return tube 99 may be engaged with the rotary housing 90, which return tube 99 is described in further detail below.

Figure 8C:
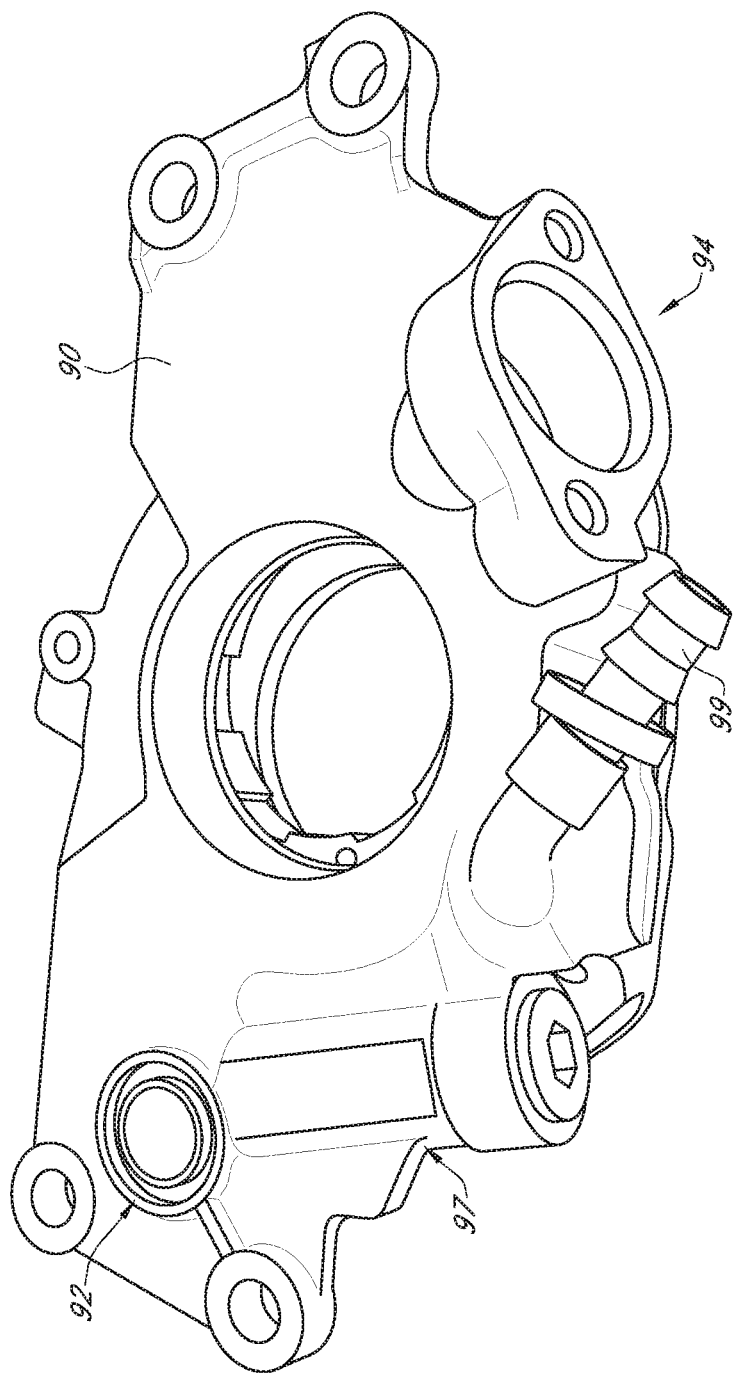
FIG. 8C provides a rear perspective view of the illustrative embodiment shown in FIGS. 8A & 8B.

A back side of an illustrative embodiment of a rotary pump 80 is shown in FIG. 8C. It is contemplated that for the illustrative embodiment, this side may be facing the engine when the rotary pump 80 is in use. An outlet 92 may be formed in the rotary housing 90. Depending on the application, the outlet 92 may directly abut a portion of the engine block such that pressurized oil flows directly from the rotary pump 80 to the engine block via an interface between the outlet 92 and a corresponding aperture in the engine block, which interface may be sealed via an O-ring. However, the scope of the present disclosure is in no way limited by the structure and/or methods employed to transfer oil from the rotary pump 80 to the engine and/or components thereof.

Figure 9:
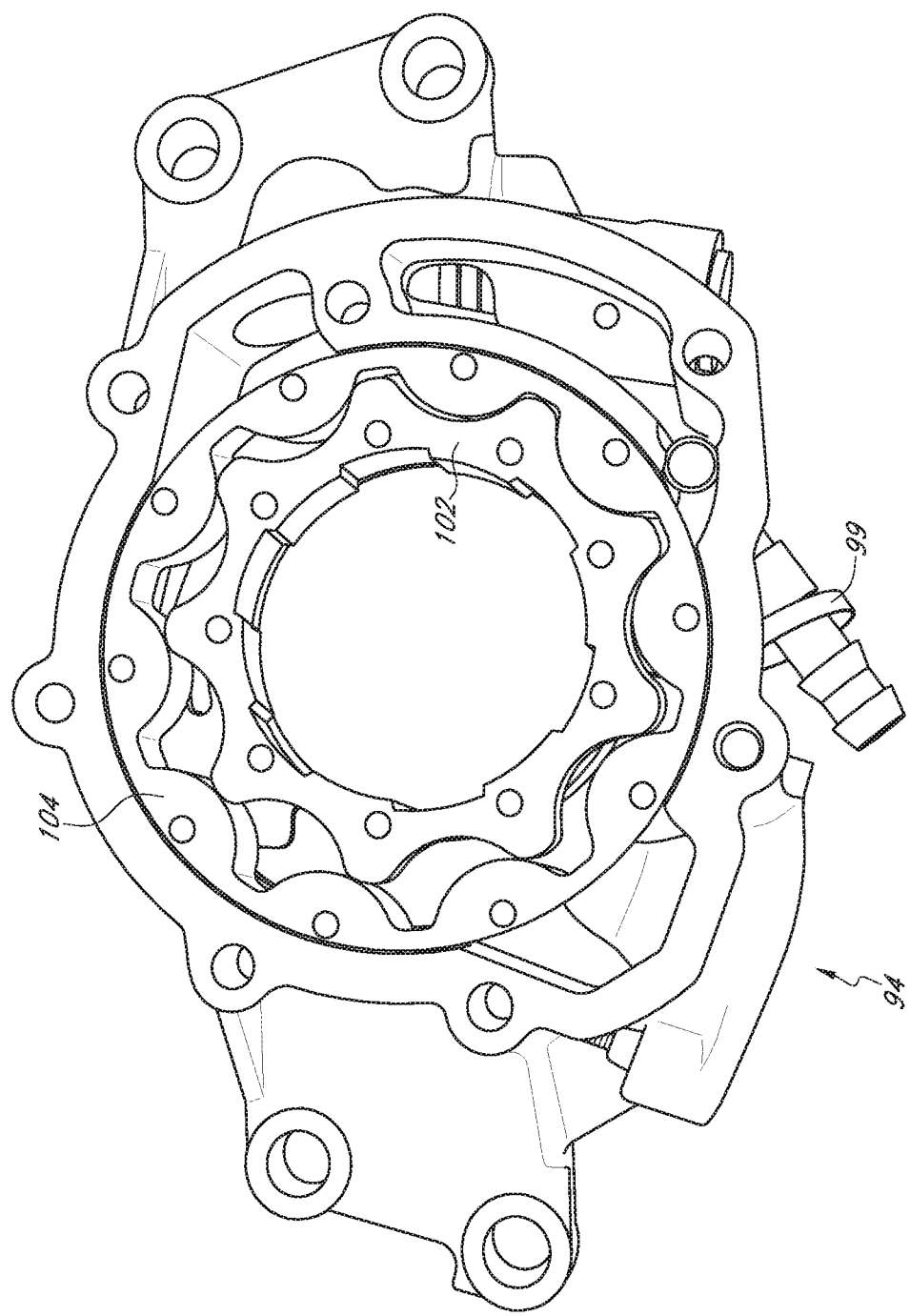
FIG. 9 provides a front perspective view of the illustrative embodiment shown in FIGS. 8A-8C with the cover removed.
Figure 10:
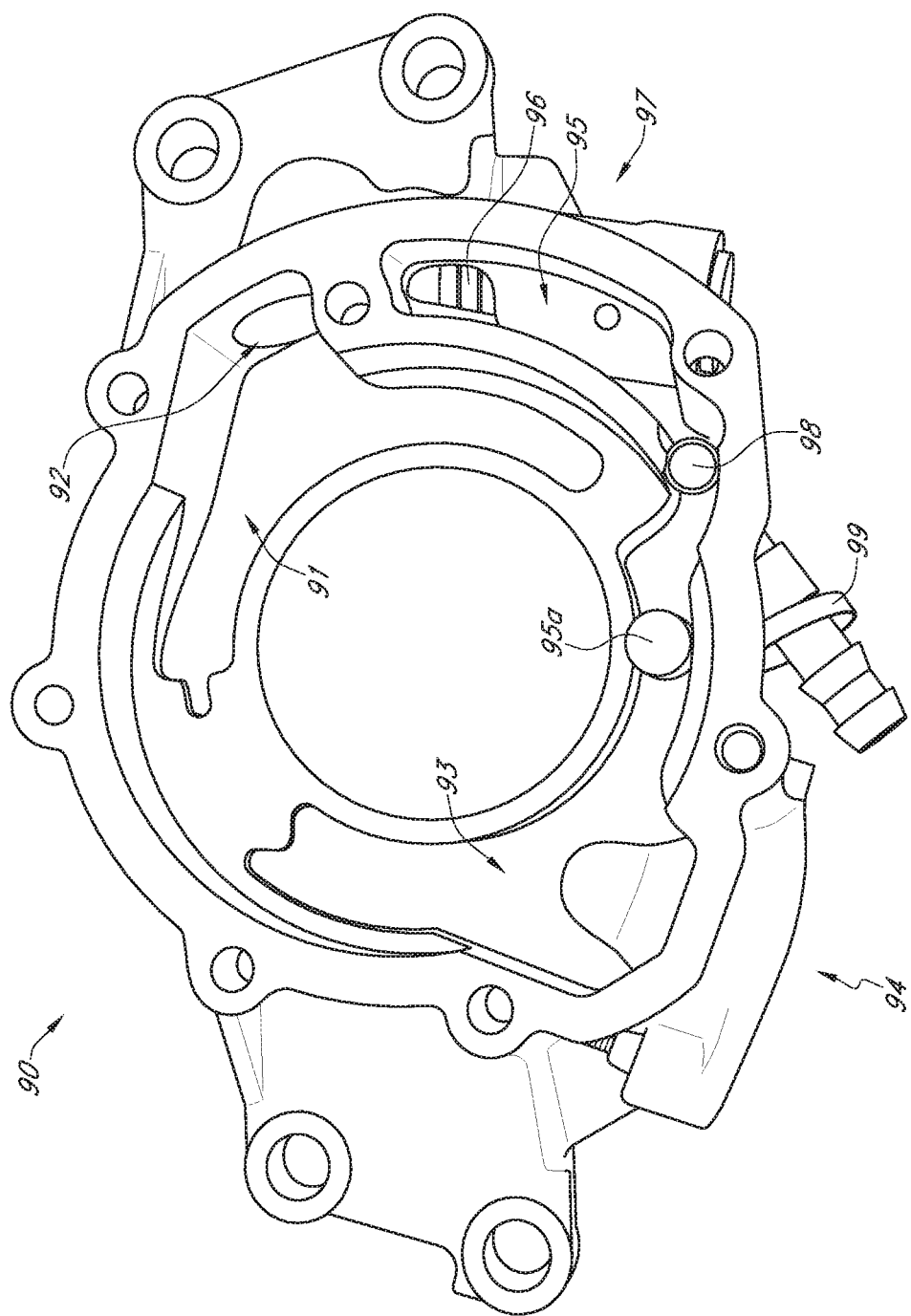
FIG. 10 provides a front perspective view of the illustrative embodiment shown in FIGS. 8A-9 with the cover and rotary gear set removed.

FIG. 9 shows the illustrative embodiment of a rotary pump 80 with the rotary cover 90a removed. As shown, a ring gear 104 may be positioned in an internal portion of the rotary pump 80 between the rotary housing 90 and the rotary cover 90a, and an inner gear 102 may be positioned inside a portion of the ring gear 104. Additionally, the inner gear 102 and/or ring gear 104 may be configured with dimples, grooves, and/or bores as previously described herein for other embodiments of a rotary pump 80.

FIGS. 10A & 10B provides two views of the front of an illustrative embodiment of a rotary housing 90 with the cover 90a and the ring gear 104 and inner gear 102 removed. Generally, the interior of the illustrative embodiment of a rotary housing 90 may be formed with an inlet cavity 93 in fluid communication with the inlet 94 and an outlet cavity 91 in fluid communication with the outlet 92. The pressure relief portion 97 may also be in fluid communication with the outlet 92 and/or outlet cavity 91.

Generally, the pressure relief portion 97 may be configured to provide a bypass channel for pressurized oil discharged from the rotary pump 80 if the pressure of the oil is at or above a specific threshold. The pressure relief portion 97 may include internal components (one illustrative embodiment of which is a spring and valve) designed to open a bypass channel at a specific pump discharge pressure. In one illustrative embodiment, the internal components are configured as a helical spring biasing a ball valve against the pump discharge pressure. When the pump discharge pressure overcomes the biasing force of the spring, the ball valve opens so that oil from the pump discharge may flow through the bypass. In some applications a ball valve may be preferable to a plug valve since a ball valve may seat (and therefore seal) better than a plug valve, and a ball valve may generally be immune to binding forces that may interfere with the actuation of a plug valve. However, any other structure and/or method may be used to selectively open a bypass channel without limitation.

The pressure relief portion 97 may be configured with a pressure relief discharge 96, such that when the pump discharge pressure reaches or exceeds the set threshold of the pressure relief portion 97, oil is routed through a part of the pressure relief portion 97 and out the pressure relief discharge 96 (i.e., a bypass channel is opened, the outlet of which is the pressure relief discharge 96). The pressure relief discharge may be in fluid communication with the pressure relief cavity 95 formed in the rotary housing 90. A return channel 98 may also be in fluid communication with the pressure relief cavity 95, and may also be in fluid communication with a return tube 99. The return tube 99 may be in fluid communication with the inlet 94, such that pressurized oil passing through the pressure relief portion 97 is routed to the inlet 94 of the rotary pump 80. In this manner, a pressure relief portion 97 configured with a valve and biasing member (e.g., spring) may act as a modulator valve since it may experience a certain magnitude of pressure on either side of the valve. As shown in the illustrative embodiment, a plug 95*a* may be placed between a pressure relief cavity 95 and the inlet cavity 93 to prevent oil passing through the pressure relief portion 97 from flowing through the pressure relief cavity 95 to the inlet cavity 93.

Generally, the illustrative embodiment of a rotary pump 80 shown in FIGS. 8A-10B provides efficiencies in operation over pumps of the prior art between 4 and 50 percent. Whereas prior art pumps generally wasted the potential energy of pressurized oil passing through the pressure relief portion 97, the illustrative embodiment of a rotary pump 80 extracts at least a portion of that potential energy by rerouting the pressurized oil to the inlet 94, thereby reducing the amount of energy required to be input to the rotary pump 80 to achieve a certain discharge pressure at certain operating conditions. That is, the illustrative embodiment of a rotary pump 80 may require less power applied to the inner gear 102 to generate desired flow characteristics (e.g., pressure, volumetric flow rate, etc.) at the outlet 92. The specific efficiency gain over prior art pumps may depend on several factors including but not limited to throttle position of the engine, crankshaft speed, engine wear, fluid characteristics (e.g., viscosity, temperature, etc.), and/or clearances between various elements of the rotary pump 80. Accordingly, the scope of the present disclosure is in no way limited by the actual efficiency gained from employing a rotary pump 80 having one or more features shown in the illustrative embodiment thereof.

ILLUSTRATIVE EMBODIMENT OF AN ENGINE

Figure 11:
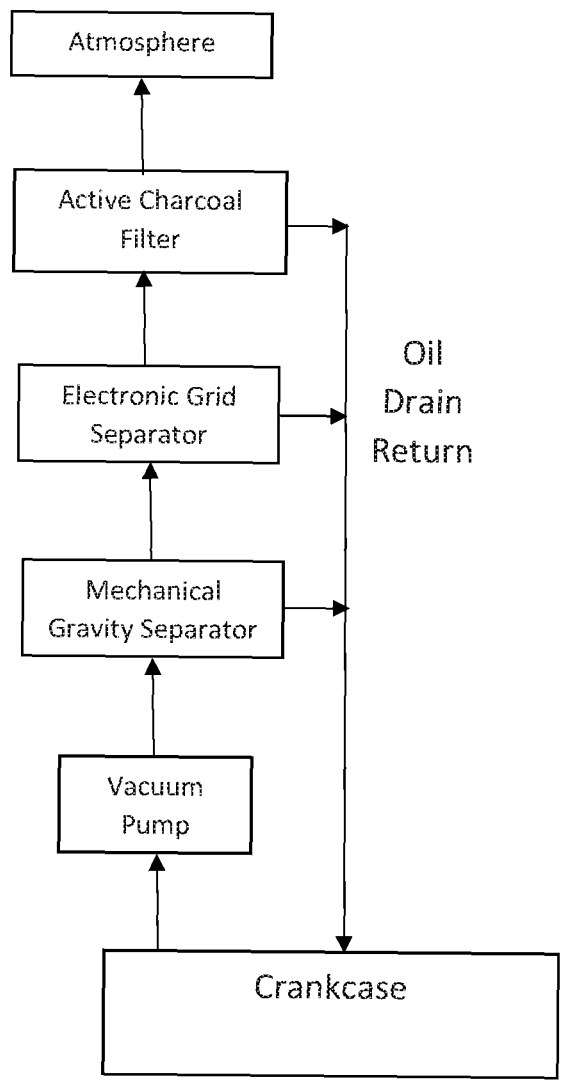
FIG. 11 provides a schematic diagram of an embodiment of a pump system that may use various aspects of the present disclosure.

A schematic diagram of an illustrative embodiment of an engine that may use various embodiments and/or features of the pump system disclosed herein is shown in FIG. 11. In the illustrative embodiment shown in FIG. 11, a portion of the engine, which may be configured as an internal combustion engine, may be operated at a pressure less than atmospheric. It is contemplated that for most embodiments it will be advantageous to operate at least the portion of the engine through which lubricant (e.g., oil) flows at a pressure less than atmospheric. In the illustrative embodiment, this portion of the engine may be generally referred to as a "crankcase," but that term is in no way limiting to the scope of the embodiment shown in FIG. 11, and any other portion and/or portions of an engine may be operated as less than atmospheric pressure without departing from the spirit and scope of the present disclosure.

As shown in the illustrative embodiment, a vacuum pump may be in fluid communication with a portion of the crankcase so as to reduce the pressure within the crankcase to an amount less than atmospheric. In one embodiment it is contemplated that the optimal amount of pressure reduction within the crankcase may be between 0.5 and 8.5 inches of water. However, other amounts of pressure reduction may be used without limitation. Additionally, it is contemplated that for some applications it may be advantageous to position the vacuum pump as close to the top of the engine as possible so that the vacuum pump draws as little lubricant (e.g., oil) into the intake of the vacuum pump as possible.

The vacuum pump may discharge to a separator, which may be configured as an electrostatic separator. The separator may function to condense lubricant mist and/or small droplets into larger droplets, and the separator may be configured to subsequently condense those larger droplets into a liquid stream and/or large droplets. The separator may be in fluid communication with the crankcase so that the liquid stream and/or large droplets of lubricant may be returned to the crankcase. Additionally, the crankcase may be in fluid communication with separator such that lubricant mist occurring in a portion of the crankcase may move to the separator independently of the vacuum pump, such that the separator may act upon that lubricant mist and return that lubricant mist to the crankcase. The separator may also include a purge stream, which may be vented to the exhaust of the engine or a different location, depending on the specific application.

In an illustrative embodiment the flow characteristics (volumetric flow rate, pressure differential, etc.) of the vacuum pump may be dictated by the rate of speed at which the engine is turning. Accordingly, the illustrative embodiment of an engine shown in FIG. 11 may be configured such that the amount of vacuum applied to the crankcase is constant and/or relatively constant independent of the engine speed and/or other operating conditions of the engine. Such a configuration may require various electronic controllers and/or communication pathways between the engine control unit and the vacuum pump, by-pass valves and/or other plumbing associated with the vacuum pump or other components of the engine, and/or check valves and/or control valves to prevent and/or control the flow of various fluids and/or gases within the engine. All such components and/or combinations thereof are within the scope of the present disclosure and any suitable configuration thereof may be used with the engine depending on the specific application thereof.

It is contemplated that an engine configured according to the illustrative embodiment shown in FIG. 11 may require a pump system 10 similar and/or corresponding to those shown in FIGS. 1-10B. However, other types of pumps and/or pump systems 10 may be used without limitation, and specifically pumps and/or pumps systems capable of suitable operation at or below atmospheric pressure.

It is further contemplated that an engine configured according to the illustrative embodiment shown in FIG. 11 may be more economical to operate than a prior art engine. The illustrative embodiment may increase the amount of lubricant volume and/or pressure to various engine components, and may also be employed with engines having a vacuum pan. The illustrative embodiment may allow the engine to function in environments wherein the ambient pressure is less and/or considerably than 1 atm (e.g., less than 0.1 atm). The illustrative embodiment may increase longevity, power output, and lubricant flow as compared to prior art engines. Additionally, an engine configured according to the illustrative embodiment may be up to 50% more efficient than a similar prior art engine. Furthermore, an engine according to the illustrative embodiment may experience less lubricant leakage through piston rings and/or valve guides than similar prior art engines. The illustrative embodiment of a pump, pump system, and/or engine disclosed herein may have other benefits over prior art engines without limitation. The preceding benefits mentioned herein are by no way exhaustive and/or limiting, and are included for illustrative purposes only.

ILLUSTRATIVE EMBODIMENT OF A MODULAR PUMP

Another embodiment of a rotary pump 80 and/or components that may be used therewith having certain features according to the present disclosure is shown in FIGS. 12A-20B, wherein the rotary pump 80 may be configured as a modular pump 100. However, the concepts and disclosure herein related to a modular pump 100 may be adapted for use in pumps other than rotary pumps 80, and the scope of the modular pump 100 extends to any type and/or style of pump disclosed herein without limitation unless so indicated in the following claims.

Some features of an illustrative embodiment are described in Appendix A, which is made a part of this disclosure. It is contemplated that the type of modular pump 100 shown in FIGS. 12A-20B may be configured for use as an oil pump for internal combustion engines, wherein the modular pump 100 may receive rotational energy from a component of the engine, including but not limited to a crankshaft and/or camshaft. Additionally, the illustrative embodiment of a modular pump 100 shown in FIGS. 12A-20B may be configured such that it is may be mounted to a main cap 19 (as shown in FIGS. 12A-14) and/or other portion of an engine. Furthermore, it is contemplated that the illustrative embodiment of a modular pump 100 shown in FIGS. 12A-20B may be configured for use in place of gear-to-gear pumps, such as that shown in FIGS. 1 & 2. However, other uses and/or orientations for the modular pump 100 exist, and therefore the scope of the present disclosure is in no way limited by the specific application for which a modular pump 100 is designed and/or the mounting location, structure, and or method thereof unless so indicated in the following claims.

Figure 13:
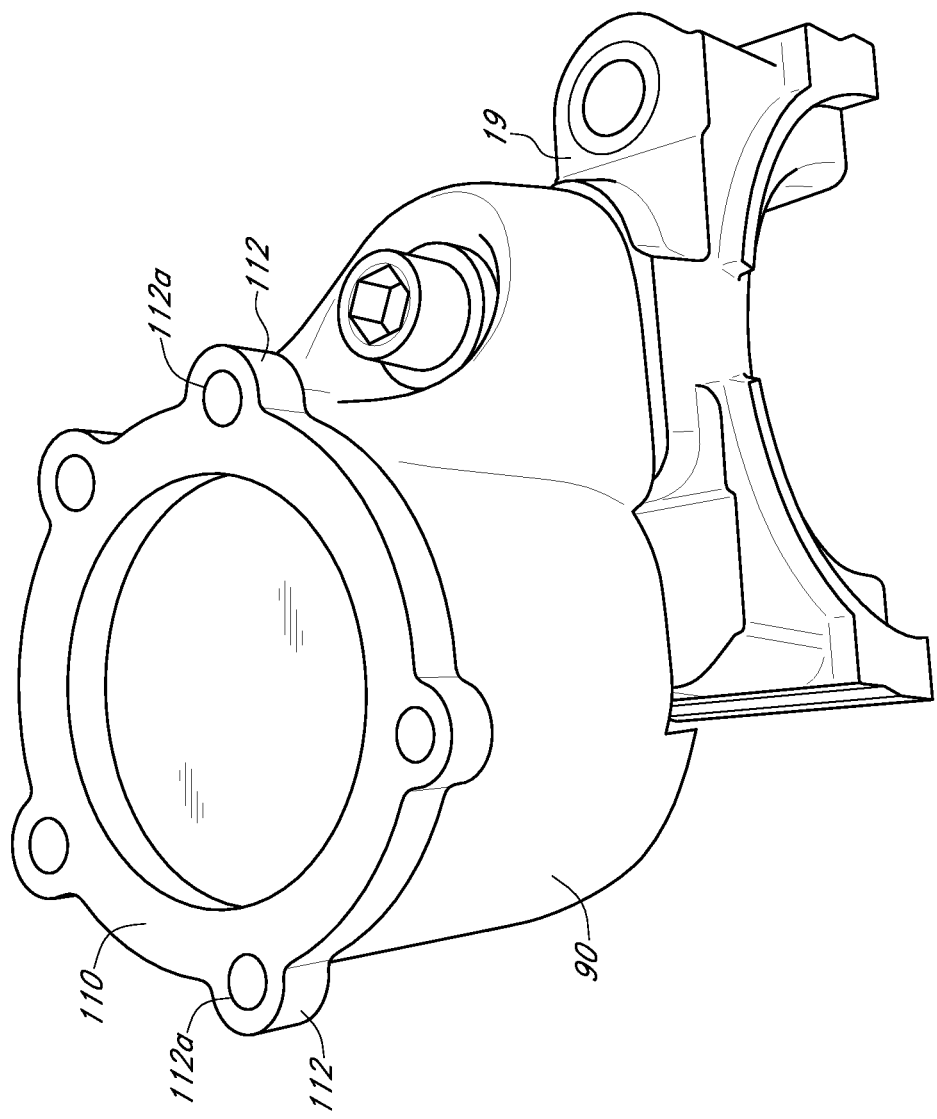
FIG. 13 provides a perspective view of the embodiment of a main body shown in FIG. 12 with an embodiment of a spacer placed on the main body.
Figure 14:
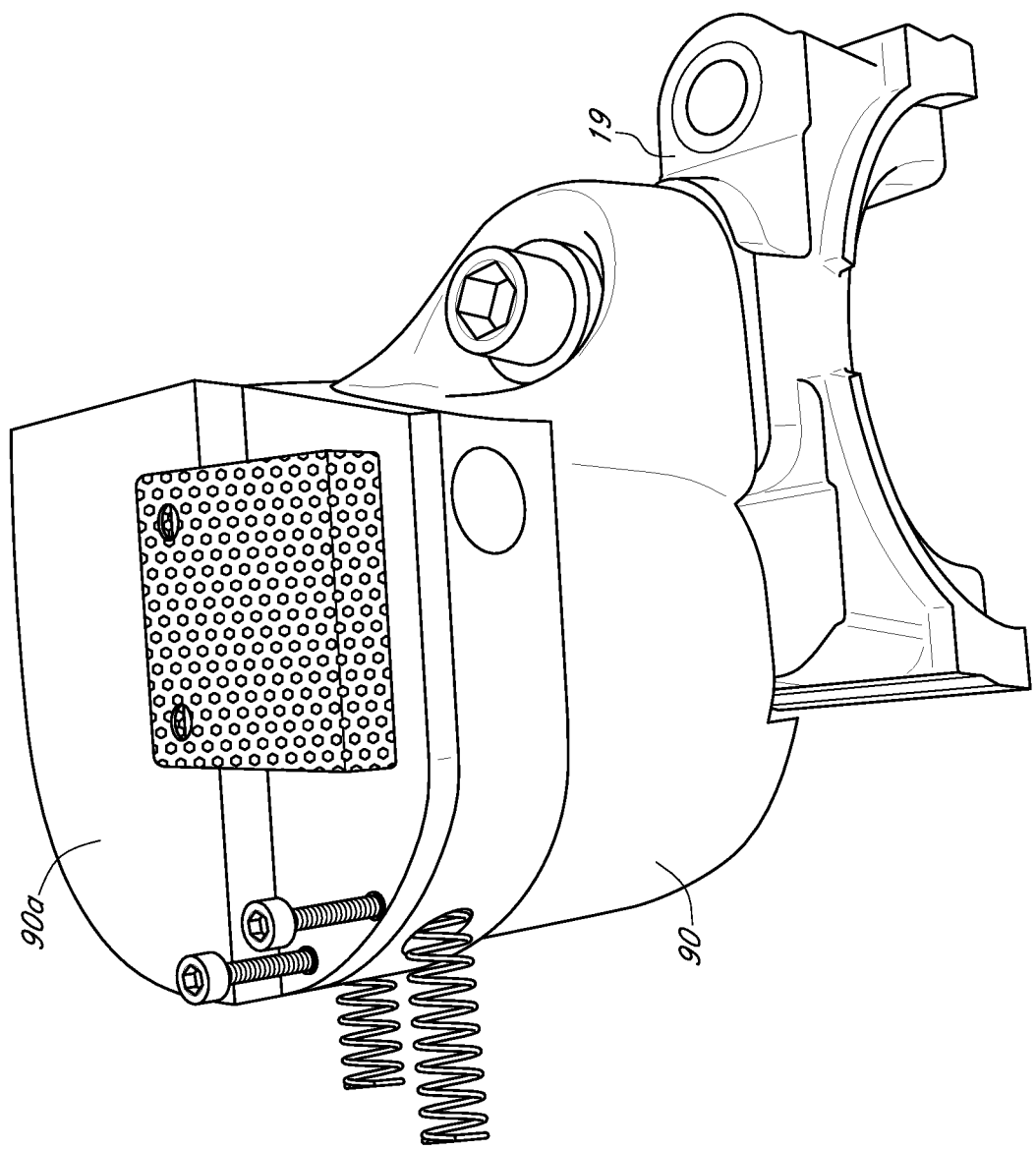
FIG. 14 provides a perspective view of the embodiment of a main body shown in FIGS. 12 & 13 with an illustrative embodiment of a cover housing engaged with the main body.
Figure 15:
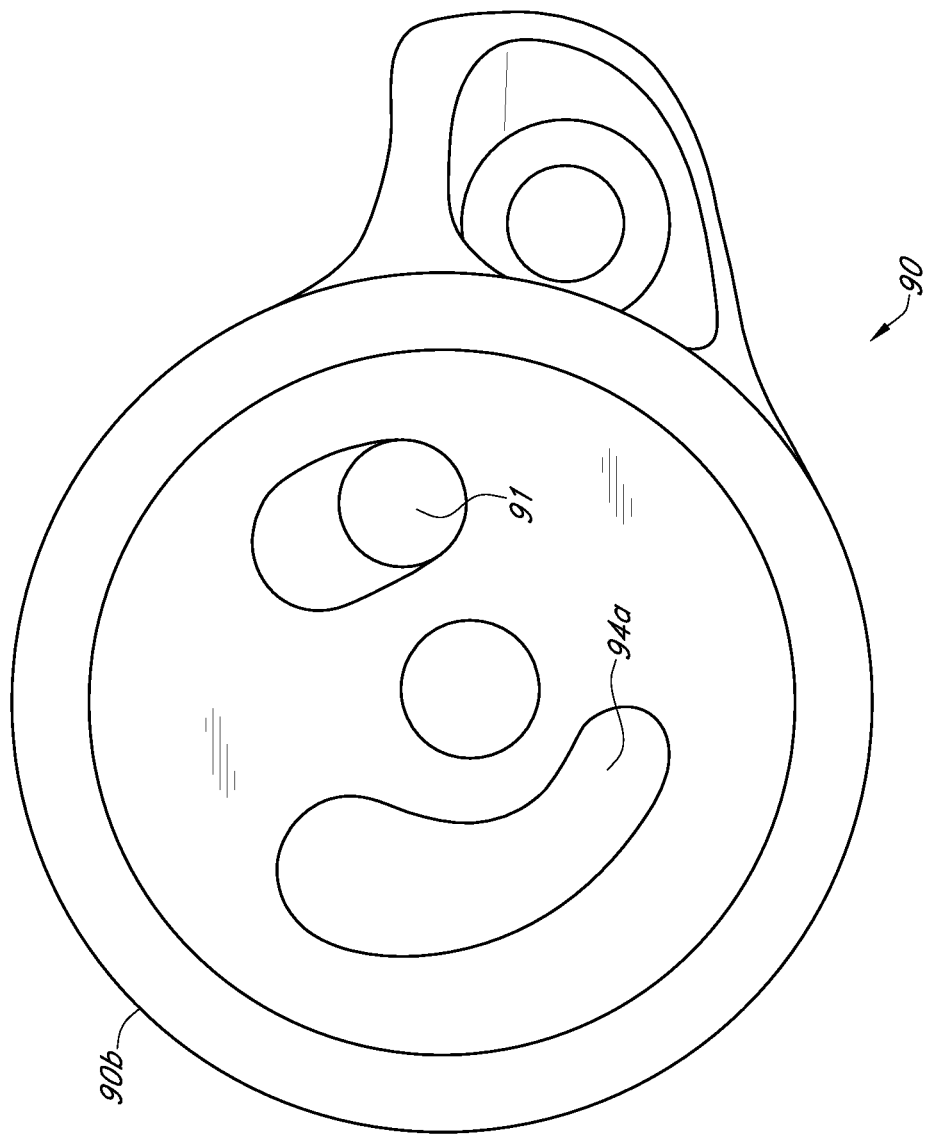
FIG. 15 provides a perspective view of an interior portion of the embodiment of a main body shown in FIGS. 12-14.
Figure 16:
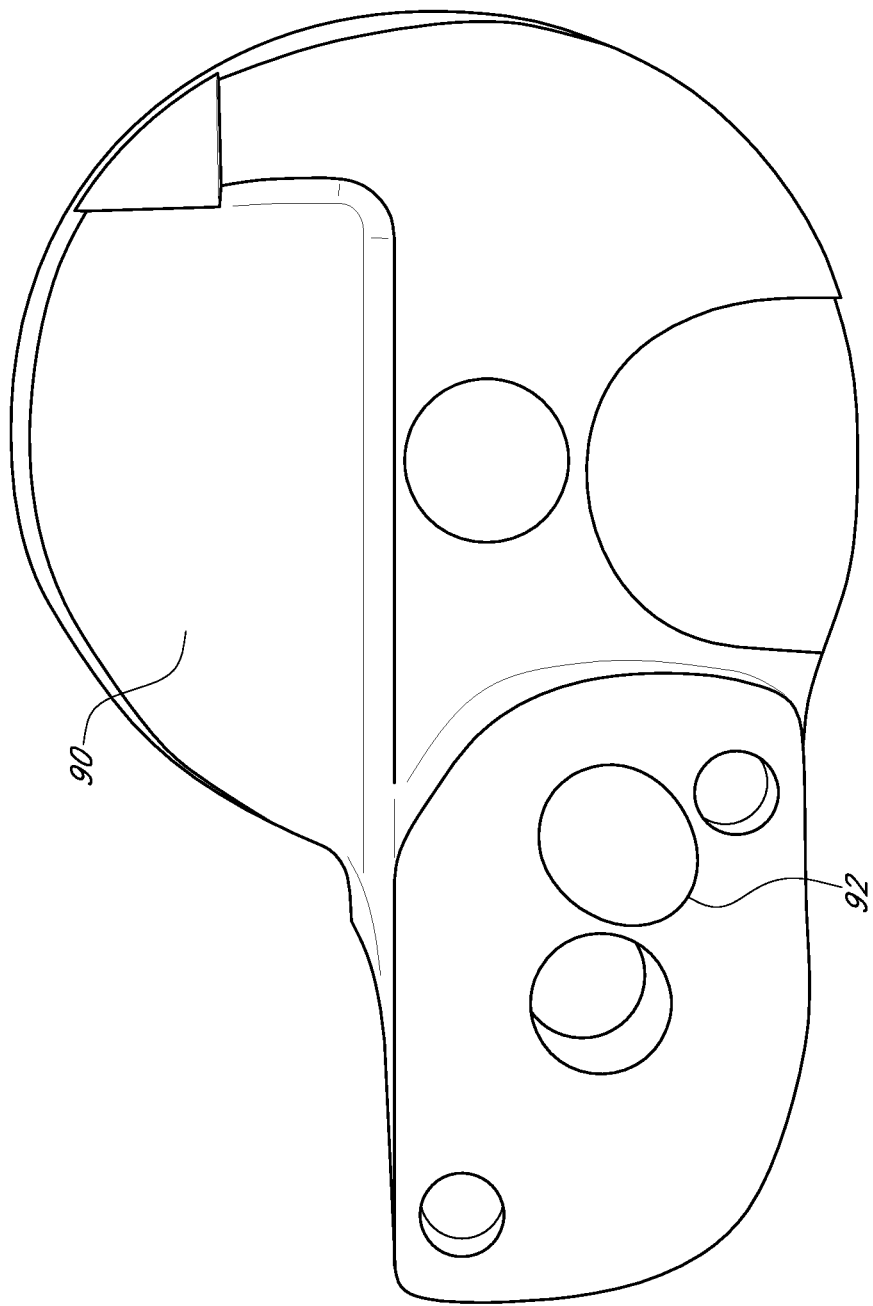
FIG. 16 provides a perspective view of an exterior portion of the embodiment of a main body shown in FIGS. 12-15.

Referring now to FIGS. 12A-15, the modular pump 100 may be configured with a main body having a generally cylindrical rotary housing 90 to accommodate a gear set comprised of an inner gear 102 and a ring gear 104. The modular pump 100 may be configured such that a plurality of gear sets may be used with a single main body and/or rotary housing 90 and rotary cover 90a. An interior view of an illustrative embodiment of a rotary housing 90 with the gear set removed is shown in FIG. 15, wherein the inlet side of the pump is generally positioned on the left side of the figure and the outlet side is generally positioned on the right side of the figure. An inlet reservoir 94a may be formed on the interior axial surface to provide a buffer of inlet fluid supply for the modular pump 100 during use.

Figure 12A:
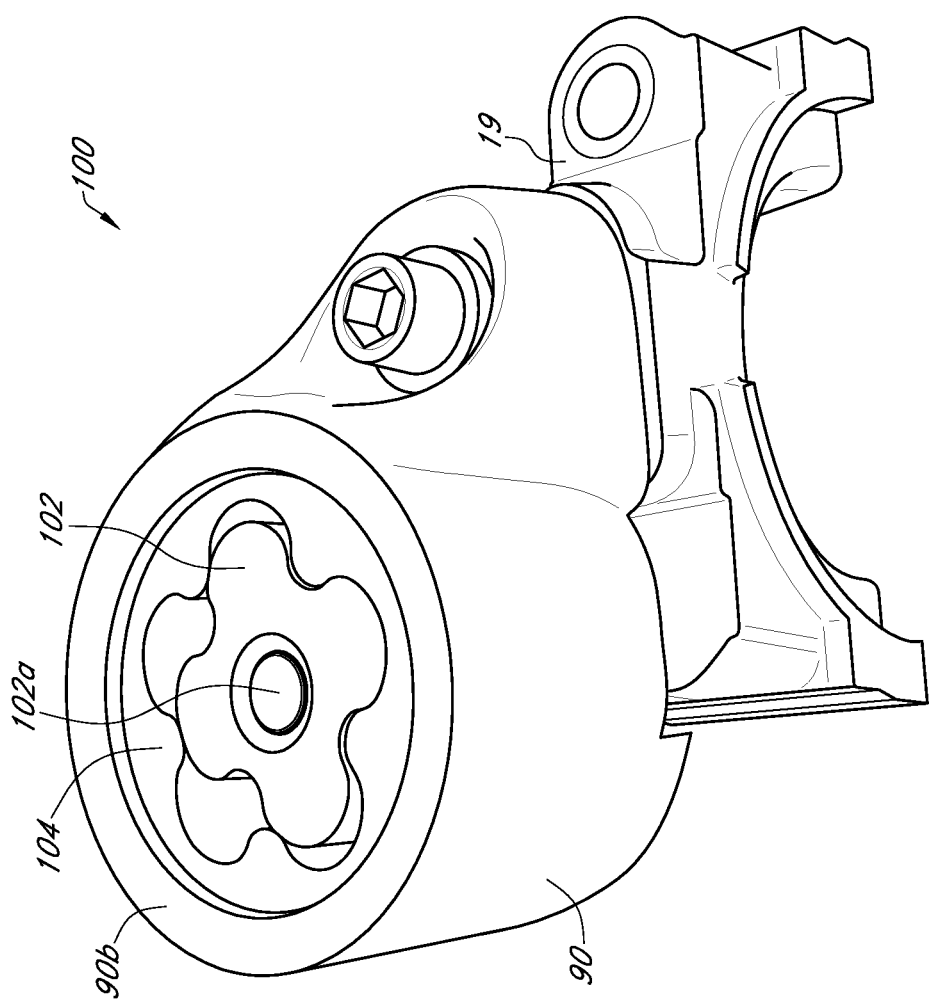
FIG. 12A provides a perspective view of an illustrative embodiment of a main body and gear set of another embodiment of a pump engaged with a main cap.
Figure 12B:
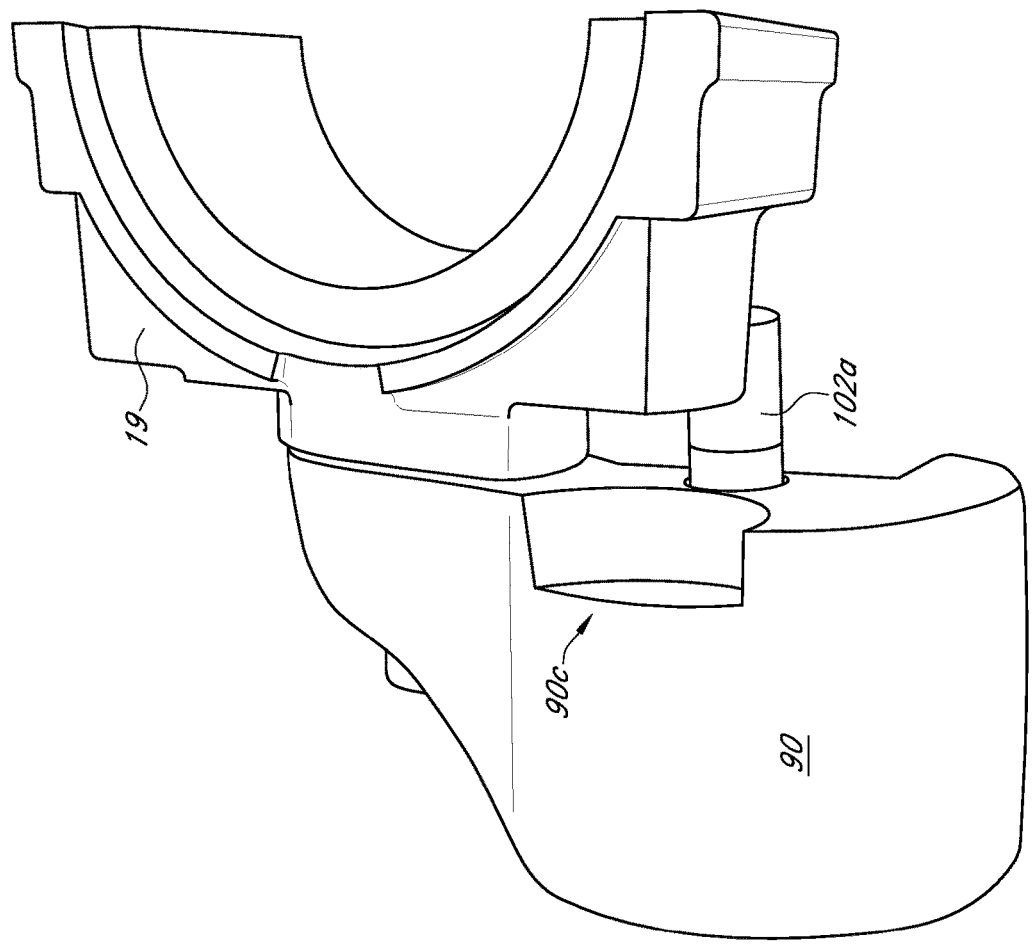
FIG. 12B provides another perspective view of the illustrative embodiment of a main body and gear set of another embodiment of a pump engaged with a main cap.

A perspective view of the modular pump 100 with a gear set positioned in the rotary housing 90 and with the rotary cover 90a removed is shown in FIG. 12A. It is contemplated that in an aspect, the modular pump 100 may receive energy via an inner gear shaft 102a engaged with the inner gear 102, wherein rotation of the inner gear shaft 102a causes rotation of the inner gear 102. As shown in FIG. 12B, the inner gear shaft 102a may extend outward from the rotary housing 90 to engage another rotational energy source. However, other structures and/or methods of providing rotational energy to the modular pump 100 may be used without limitation unless so indicated in the following claims.

Figure 18C:
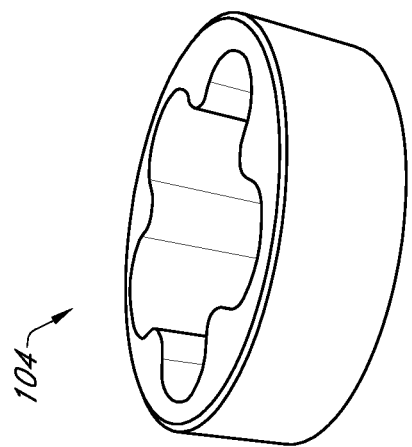
FIG. 18C provides a perspective view of another gear that may be used with the embodiment of a main body shown in FIGS. 12-16.
Figure 18B:
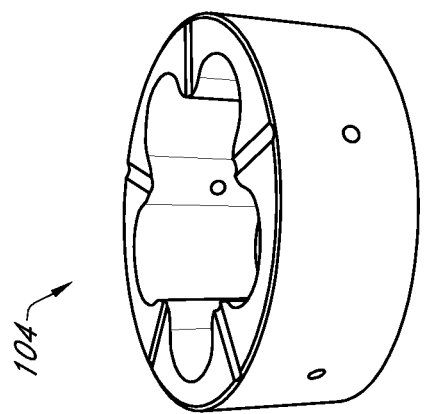
FIG. 18B provides a perspective view of another gear that may be used with the embodiment of a main body shown in FIGS. 12-16.
Figure 18A:
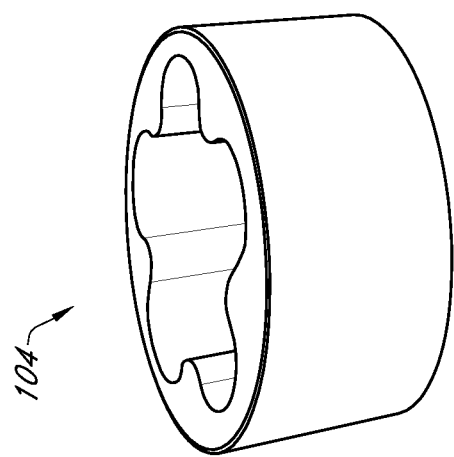
FIG. 18A provides a perspective view of a gear that may be used with the embodiment of a main body shown in FIGS. 12-16.

Three different ring gears 104 having different axial dimensions but substantially equal circumferences (i.e., substantially equal sizes and shapes), which ring gears 104 may be used with the modular pump 100 and/or rotary housing 90 shown in FIGS. 12A, 12B, and 13 body are shown in FIGS. 18A, 18B, and 18C, respectively. Each ring gear 104 may be engaged with a corresponding inner gear 102 to complete a gear set, wherein the axial dimension of the inner gear 102 may be approximately equal to the axial dimension of the corresponding ring gear 104 in a given gear set (wherein one such gear set is shown positioned in a rotary housing 90 in FIG. 12A).

To accommodate for the difference in axial dimension between the different ring gears 104 and inner gears 102 in a given gear set for a given rotary housing 90, a spacer 110 such as that shown in FIG. 13 may be employed. In an aspect of the spacer 110, it may be configured was a ring, wherein the center bore thereof may have the same shape and dimensions as the interior portion of the rotary housing 90. The spacer 110 may be positioned directly on the axial face 90b of the rotary housing 90a. In an aspect, a gear set with an axial dimension greater than that of the rotary housing 90 may extend beyond the rotary housing 90 in an amount approximately equal to the axial dimension of the spacer 110. Accordingly, each gear set with varying axial dimensions may employ a corresponding spacer 110 with an approximately equal axial dimension.

Figure 19B:
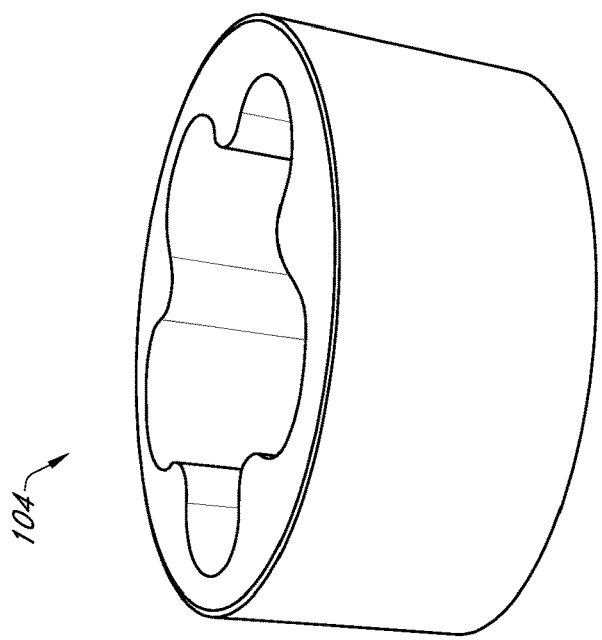
FIG. 19B provides a perspective view of the gear shown in FIG. 19A without the spacer.
Figure 19A:
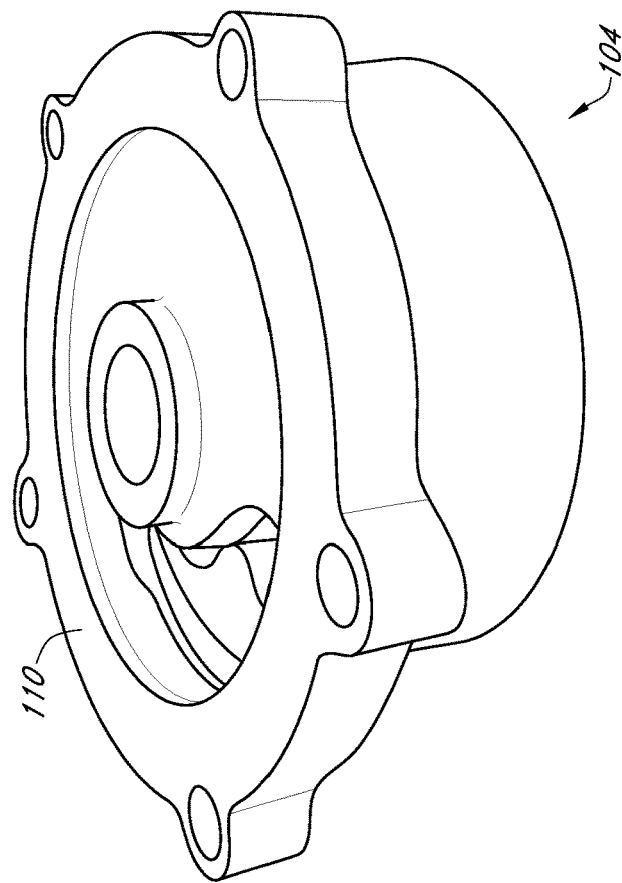
FIG. 19A provides a perspective view of a gear with a spacer placed adjacent thereto, that may be used with the embodiment of a main body shown in FIGS. 12-16.

A perspective view of a ring gear 104 without a spacer 110 is shown in FIG. 19B. A second ring gear 104 with a spacer 110 positioned immediately above the ring gear 104 is shown in FIG. 19A. From FIGS. 19A and 19B, which are shown to relative scale of one another, and in light of the present disclosure it will be apparent to one of ordinary skill in the art that the ring gear 104 shown in FIG. 19B may be used in conjunction with the spacer 110 shown in FIG. 19A for use rotary housing 90 designed for use with the ring gear 104 shown in FIG. 19A. That is, the spacer 110 in FIG. 19A may accommodate for the difference in axial dimension between the ring gear 104 shown in FIG. 19A and the ring gear 104 shown in FIG. 19B.

The spacer 110 may be formed with one or more ears 112 having an ear aperture 112a formed therein. In an aspect, the spacer 110 may be formed without ears 112 and instead have apertures formed directly in the spacer, wherein the apertures extend axially through the axial dimension of the spacer 110. However, other configurations of a spacer 110 may be used without limitation unless so indicated in the claims. When a spacer 110 is used, the rotary cover 90a may be engaged directly with the spacer 110. When a spacer 110 is not used, the same rotary cover 90a may be engaged directly with the rotary cover 90a. In any instance, gaskets, sealing material, and/or any other structures and/or method may be employed to seal various surfaces and/or interfaces to an acceptable degree, and one or more fasteners passing through the rotary cover 90a and/or spacer 110 (if present) may engage the rotary housing 90 to adequately secure the relative positions thereof.

In this manner, the modular pump 100 may facilitate a modular design, wherein a plurality of different gear sets configured for different optimal operational parameters (e.g., different volumes, pressures, and/or other fluid flow characteristics, etc.) depending on the application of the modular pump 100 may be used with a single rotary housing 90 and/or rotary cover 90a by simply accounting for the axial variation between different gear sets via one or more spacers 110. Additionally, one modular pump 100 (configured with the proper gear set and/or spacer 110) may be used in a wide variety of engines, including but not limited to Chevrolet brand large block and small block motors. A comparison As shown most clearly in FIG. 12B, the rotary housing 90 may be configured with a recess 90c thereon to provide access to a bolt on the main cap 19, which bolt may be positioned adjacent the modular pump 100. It is contemplated that providing relatively unrestricted access to the bolt of main cap 19 adjacent the modular pump 100 may facilitate relatively easy access to that bolt without requiring removal of the modular pump 100.

Figure 17:
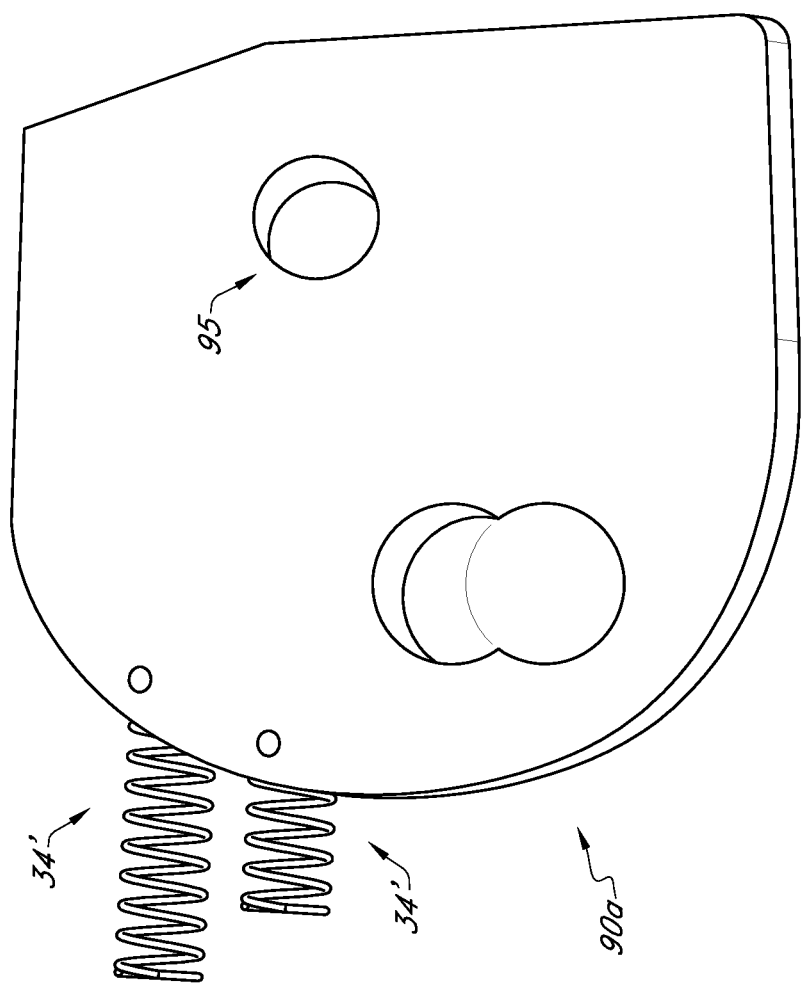
FIG. 17 provides a perspective view of an interior portion of the embodiment of a cover housing shown in FIG. 14.

The rotary cover 90a may be configured with a plurality of pressure relief assemblies 34' as best shown in FIGS. 14 and 17. Generally, each pressure relief assembly 34' may be configured such as those shown in FIGS. 3A-3D and as previously described herein for a pump 10. That is, the pressure relief assembly 34' may be primarily positioned in the rotary cover 90*a* and may comprise at least a spring and a valve positioned internally with respect to the rotary cover 90*a*, and which spring and valve may be positioned in a respective pressure relief channel formed in the rotary cover 90*a*.

In one aspect, the rotary cover 90*a* may be configured with two pressure relief assemblies 34' and in another aspect it may be configured with more than two pressure relief assemblies 34'. In a modular pump 100 with two pressure relief assemblies 34', which rotary pumps 80 may be especially useful for racing applications, a first pressure relief assembly 34' may be configured such that a pressure relief valve in the first pressure relief assembly 34' opens at a first pressure (which may correspond to engine idle) and the second pressure relief assembly 34' may be configured such that a pressure relief valve in the second pressure relief assembly 34' opens at a second pressure (which may correspond to greater than 50% throttle), wherein the first pressure may be lower than the second pressure. As shown in FIG. 17, both pressure relief assemblies 34' may be in fluid communication with the high-pressure portion of the modular pump 100 via a single pressure relief cavity 95, which pressure relief cavity 95 may serve as an inlet to one or more pressure relief channels. In an aspect, the modular pump 100 may be configured such that the oil pressure remains in a window between the first and second pressures regardless of engine speed (RPM). Such a configuration may allow an engine to provide adequate oil pressure at all engine speeds, which may serve to lengthen the life of an engine.

It is contemplated that a pump configured with two or more pressure relief assemblies 34' may provide an engine with a supply of oil within a relatively small pressure window across a wide range of engine and/or pump RPM. A pump so configured may reduce the relationship between engine and/or pump RPM and oil pressure. This decoupling of engine and/or pump RPM and oil pressure may be accomplished while maintaining a traditional relationship between engine and/or pump RPM and oil volumetric flow rate and/or other fluid flow characteristics.

Figure 20A:
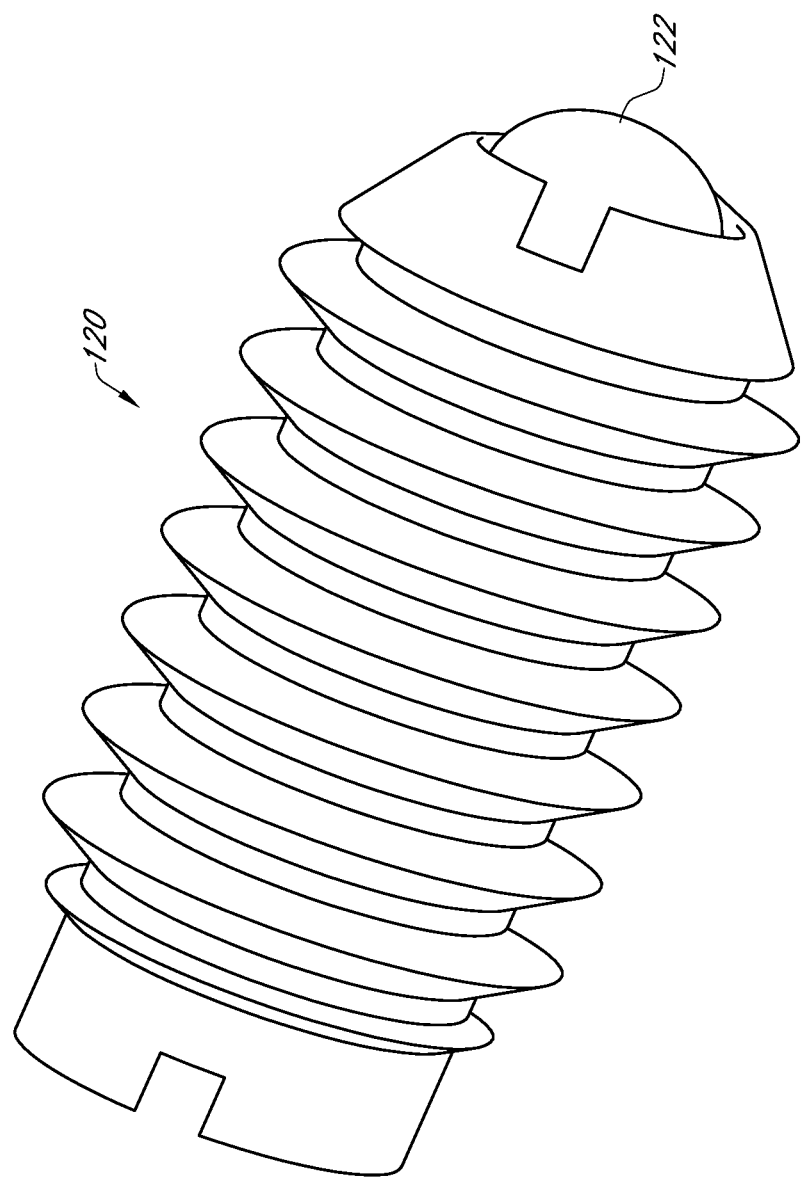
FIG. 20A provides a perspective view of an illustrative embodiment of a vapor/gas removal assembly.
Figure 20B:
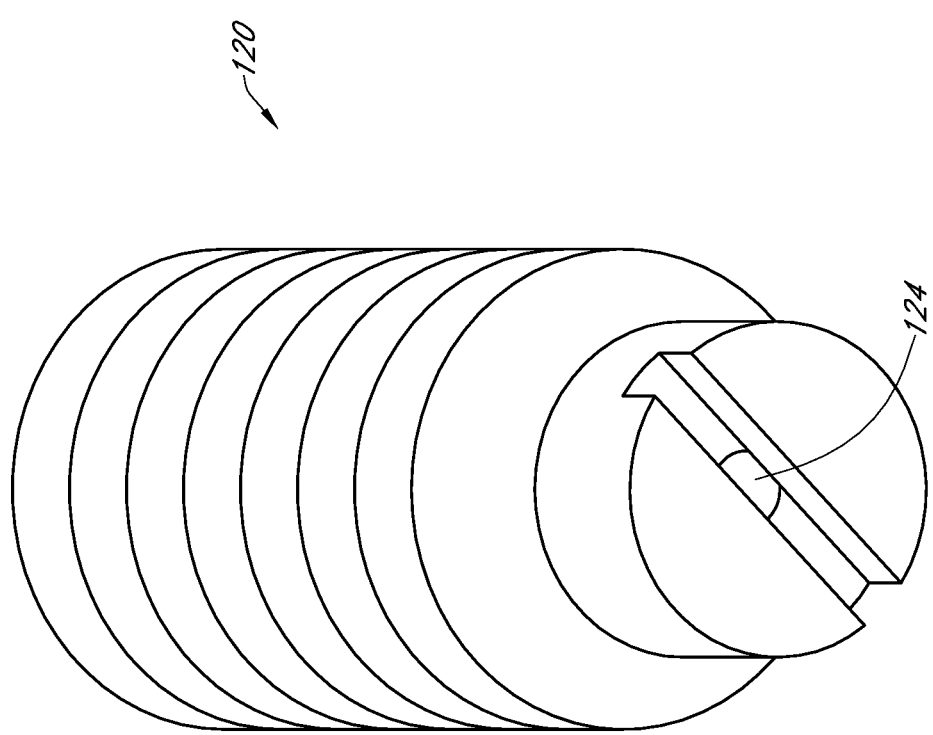
FIG. 20B provides another perspective view of an illustrative embodiment of a vapor/gas removal assembly.

One vapor/gas removal assembly 120 is shown in FIGS. 20A and 20B. The vapor/gas removal assembly may be used with any suitable pump. The vapor/gas removal assembly 120 shown in FIGS. 20A and 20B will be described now in association with a modular pump 100 similar to that shown in FIG. 12A. However, the scope of the vapor/gas removal assembly 120 is not so limited and may be configured for use with other pumps without limitation unless so indicated in the following claims.

When employed with a modular pump 100 similar to that shown in FIG. 12A, the vapor/gas removal assembly 120 may be engaged with an upper portion of a cavity formed on the interior surface of the rotary housing 90. It is contemplated that in an aspect, a vapor/gas collection cavity (not shown) may be formed in and upper axial face of the rotary housing 90 (which face is clearly shown in FIG. 15, and in which face an outlet cavity 91 and an inlet reservoir 94*a* may be formed). The vapor/gas collection cavity may be positioned on the inlet and/or outlet side of the rotary housing 90, and may extend into the upper axial face of the rotary housing 90 by an amount great enough to form a high spot within a portion of the rotary housing 90 during use. It is contemplated that in an aspect, the surface of the vapor/gas collection cavity may be smoothly contoured, but other configurations may be used without limitation unless so indicated in the following claims.

The vapor/gas collection cavity may be formed with an aperture at an upper portion thereof extending from the interior of the rotary housing 90 to the exterior, with which aperture the vapor/gas removal assembly 120 may be engaged. In an aspect, the aperture in the rotary housing 90 may be configured as a tapped hole and the outer periphery of the vapor/gas removal assembly 120 may be threaded so as to securely engage the tapped hole. However, any suitable structure and/or method may be used to engage a vapor/gas removal assembly 120 with a pump without limitation unless so indicated in the following claims.

In an aspect, the vapor/gas removal assembly 120 may be configured as a generally cylindrical plug having a bore along the longitudinal axis thereof. A ball-and-spring assembly, which may be comprised of a spring (not shown) and ball 122, may be positioned within the bore. The ball 122 may be positioned on the interior side (e.g., adjacent the gear set and facing into the rotary housing 90) and the opposite end of the vapor/gas removal assembly 120 facing away from the gear set. An aperture serving as an outlet 124, shown in FIG. 20B, may be formed in the end of the vapor/gas removal assembly 120 opposite the ball 122, and may be in fluid communication with the bore such that vapor/gas and/or fluid within the bore may traverse through the bore to the outside of the pump via the outlet 124. In an aspect, the diameter of the bore may be 60 thousandths of an inch greater than the diameter of the ball 122, which may be large enough to allow vapor/gas to pass through the bore, but which may be small enough such that the volume of oil passing therethrough may be negligible in many applications. The vapor/gas removal assembly 120 may be configured to begin to open when the ball 122 experiences 0.25 pounds of pressure per square inch and become fully open at 1 psi, or it may be configured such that it begins to open when the ball 122 experiences 10 psi and becomes fully open at 12 psi. However, other configurations, dimensions, etc. of the vapor/gas removal assembly 120 may be used without limitation unless so indicated in the following claims.

It is contemplated that in an aspect, a vapor/gas removal assembly 120 may reduce the percentage of air that is mixed with wet sump oil in an engine. Generally, those skilled in the art prefer to prevent any air mixed with oil and/or at least mitigate the amount of air mixed with oil, as oil aeration compromises the hydrodynamic wedge of oil lubrication principles. The vapor/gas removal assembly 120 may serve to purge entrapped air from the interior portion of a pump.

The various contours, shapes, dimensions, and/or general configuration of the outlet cavity 91, outlet 92, inlet cavity 93, inlet 94, pressure relief cavity 95, pressure relief discharge 96, return channel 98, and/or return tube 98 may vary from one embodiment of the rotary pump 80 to the next, and are therefore in no way limiting to the scope of the pressure disclosure. Additionally, the specific shape of the rotary housing 90 and/or cover 90*a* may vary from one embodiment of the rotary pump 80 to the next, as may the specific mounting requirements of the rotary pump 80 and/or engagement points between the rotary pump 80 and engine and/or other structure. Accordingly, the scope of the present disclosure is in no way limited by the specific engine and/or brand of engine for which the rotary pump 80 is configured. That is, the rotary pump 80 extends to all types, brands, and/or uses of a rotary pump 80 wherein the application of the rotary pump 80 may benefit from one or more features disclosed herein.

The pump 10, main body 20, cover housing 30, return channel 38, drive gear 40, idler gear 50, pressure relief assembly, rotary gear set 81, rotary pump 80, modular pump 100 and various elements thereof may be constructed of any suitable material known to those skilled in the art. In the embodiment as pictured herein, it is contemplated that most elements will be constructed of metal or metallic alloys, polymers, or combinations thereof. However, other suitable materials may be used. Any spring 62 used in any embodiment may be constructed of any resilient material having the appropriate load characteristics. For example, rubber, polymer materials, metallic springs, or any other suitable material may be used for the spring 62.

It should be noted that the engine, pump 10, pump system, main body 20, cover housing 30, return channel 38, drive gear 40, idler gear 50, pressure relief assembly 120, rotary pump 80, rotary pump gear set 81, rotary housing 90, and modular pump 100 are not limited to the specific embodiments pictured and described herein, but is intended to apply to all similar apparatuses and methods for providing the various benefits of those elements unless so indicated in the following claims. Modifications and alterations from the described embodiments will occur to those skilled in the art without departure from the spirit and scope of the pump 10, rotary pump 80, and/or modular pump 100.

Furthermore, variations and modifications of the foregoing are within the scope of the pump 10, rotary pump 80, modular pump 100, and/or pump system. It is understood that the pump 10, rotary pump 80, modular pump 100, and pump system as disclosed and defined herein extends to all alternative combinations of two or more of the individual features mentioned or evident from the text and/or drawings. All of these different combinations constitute various alternative aspects of the pump 10, rotary pump 80, modular pump 100, and/or pump system. The embodiments described herein explain the best modes known for practicing the pump 10, rotary pump 80, modular pump 100, and/or pump system and will enable others skilled in the art to utilize the same. The claims are to be construed to include alternative embodiments to the extent permitted by the prior art.

The invention claimed is:

1. A modular pump comprising:
   a. a housing having an internal portion wherein said housing is formed with an axial face on a distal surface of said housing;
   b. a first gear set configured to be operably positioned in said internal portion of said housing such that an exterior surface of said first gear set is adjacent to an interior surface of said internal portion, wherein a first gear of said first gear set extends beyond said axial face of said housing in a dimension parallel to an axial dimension of said gear set when operably positioned;
   c. a spacer configured to abut said axial face of said housing, wherein said spacer is formed with a central bore therein, wherein said central bore of said spacer has a size and shape approximately equal to a size and shape of said internal portion of said housing at said axial face, and wherein a thickness of said spacer in said axial dimension of said first gear set is equal to a distance said first gear set extends beyond said axial face of said housing in said axial dimension of said first gear set;
   d. a second gear set configured to be operably positioned in said internal portion of said housing such that an exterior surface of said second gear set is adjacent to said interior surface of said internal portion, wherein an axial dimension of said first gear set is substantially equal to an axial dimension of said internal portion of said pump housing such that a first axial face of said first gear set is substantially flush with said axial face on said distal surface of said pump housing, wherein said modular pump may provide a first set of output fluid flow characteristics utilizing said first gear set and said spacer and a second set of output fluid flow characteristics utilizing said second gear set;
   e. a cover engaged with said housing, wherein said spacer is configured to be positioned between said housing and said cover when said second gear set is operably positioned within said internal portion of said housing, and wherein an engagement between said housing and said cover secures the relative positions of said housing, and said cover.

2. The modular pump according to claim 1 wherein said modular pump is further defined as a rotary pump, and wherein one of said first gear set or said second gear set and comprises a third gear and wherein one of said first gear or said second gear and said third gear is a ring/drive gear and the other of said first gear or said second gear and said third gear is an inner/idler gear.

3. The modular pump according to claim 1 wherein one of said first gear set or said second gear set and comprises a third gear and wherein one of said first gear or said second gear and said third gear is a drive gear and the other of said first gear or said second gear and said third gear is an idler gear.

4. The modular pump according to claim 1 wherein, when said first gear set is operably positioned in the housing, said spacer is positioned between said housing and said cover and is secured relative to both by said engagement.

5. The modular pump according to claim 1 wherein, when said second gear set is operably positioned in the housing, said cover engages said axial face of said housing.

* * * * *